United States Patent
Finke

(10) Patent No.: US 10,852,717 B2
(45) Date of Patent: Dec. 1, 2020

(54) MATERIAL LOGISTICS SYSTEM

(71) Applicant: Identytec GmbH & Co. KG, Hildesheim (DE)

(72) Inventor: Thorsten Finke, Algermissen (DE)

(73) Assignee: Identytec GmbH & Co. KG, Hildesheim (DE)

( * ) Notice: Subject to any disclaimer, the term of this patent is extended or adjusted under 35 U.S.C. 154(b) by 36 days.

(21) Appl. No.: 15/603,844

(22) Filed: May 24, 2017

(65) Prior Publication Data

US 2018/0004195 A1 Jan. 4, 2018

Related U.S. Application Data

(63) Continuation of application No. PCT/EP2014/075878, filed on Nov. 27, 2014.

(51) Int. Cl.
  *G05B 19/418* (2006.01)
  *G06Q 10/08* (2012.01)
  (Continued)

(52) U.S. Cl.
  CPC ...... *G05B 19/41895* (2013.01); *B23P 19/001* (2013.01); *B65G 1/02* (2013.01);
  (Continued)

(58) Field of Classification Search
  CPC .... G05B 19/41895; B66F 9/122; B66F 9/063; B65G 1/02; B23P 19/001; B23P 21/004; G06Q 10/08
  (Continued)

(56) References Cited

U.S. PATENT DOCUMENTS 5,525,884 A 6/1996 Sugiura et al.
5,695,173 A 12/1997 Ochoa
(Continued)

FOREIGN PATENT DOCUMENTS

DE 20 2013 004209 U1 7/2013
EP 2527288 B1 * 8/2013 ................ B66F 9/20
(Continued)

OTHER PUBLICATIONS

International Search Report (ISR) in PCT/EP2014/075878, dated Jul. 28, 2015 (6 pages).

*Primary Examiner* — Kenneth M Lo
*Assistant Examiner* — Mohammed Shafayet
(74) *Attorney, Agent, or Firm* — Shlesinger, Arkwright & Garvey LLP

(57) ABSTRACT

Material logistics system for coordinating transfer of production material so that production material is available as needed at production stations of a manufacturing facility, in particular a series production facility. Thus, multiple sensors are provided for sensing a production material supply at production stations, as well as a central unit in signal-transmitting connection with the sensors and which, based on output signals transmitted from the sensors, determines logistics data relating to the production material for a particular production station. And also, using logistics data, generates control signals for the transfer of production material and provides them for further data processing units. Furthermore, the central unit uses logistics data to control a driverless transport vehicle, having a transport rack including a transport level, for transporting production material accommodated in containers, for a partially automatic container transfer between a transport rack and a storage rack of a production station.

6 Claims, 16 Drawing Sheets

(51) Int. Cl.
    *B65G 1/02*         (2006.01)
    *B66F 9/06*         (2006.01)
    *B66F 9/12*         (2006.01)
    *B23P 21/00*       (2006.01)
    *B23P 19/00*       (2006.01)

(52) U.S. Cl.
    CPC .............. *B66F 9/063* (2013.01); *B66F 9/122* (2013.01); *G06Q 10/08* (2013.01); *B23P 21/004* (2013.01)

(58) Field of Classification Search
    USPC .......................................................... 700/113
    See application file for complete search history.

(56) References Cited

U.S. PATENT DOCUMENTS

| | | | |
|---|---|---|---|
| 5,979,606 A | 11/1999 | Wheeler | |
| 8,010,220 B1* | 8/2011 | Ames | G06Q 10/08 700/119 |
| 9,120,622 B1* | 9/2015 | Elazary | B25J 19/023 |
| 9,280,153 B1* | 3/2016 | Palamarchuk | G05D 1/00 |
| 9,422,108 B2* | 8/2016 | Hognaland | B65G 1/0464 |
| 10,026,044 B1* | 7/2018 | Wurman | G06Q 10/047 |
| 2001/0020197 A1* | 9/2001 | Nakano | B65G 1/0435 700/215 |
| 2003/0225554 A1* | 12/2003 | Im | G06Q 10/08 703/2 |
| 2004/0010339 A1* | 1/2004 | Mountz | G05D 1/0274 700/216 |
| 2006/0210382 A1* | 9/2006 | Mountz | B60D 1/465 414/498 |
| 2007/0059132 A1* | 3/2007 | Akamatsu | B65G 1/0421 414/274 |
| 2008/0001372 A1* | 1/2008 | Hoffman | G06Q 10/087 280/35 |
| 2008/0077511 A1* | 3/2008 | Zimmerman | G06Q 10/00 705/28 |
| 2008/0167884 A1* | 7/2008 | Mountz | G06Q 10/087 705/29 |
| 2009/0074545 A1* | 3/2009 | Lert, Jr. | B65G 1/0492 414/276 |
| 2010/0316468 A1* | 12/2010 | Lert | B65G 1/045 414/273 |
| 2013/0103248 A1* | 4/2013 | Ogawa | B65G 1/06 701/23 |
| 2013/0213769 A1* | 8/2013 | Plakolm | B23Q 7/005 198/463.3 |
| 2013/0304253 A1* | 11/2013 | Wurman | G06Q 10/08 700/214 |
| 2014/0006229 A1* | 1/2014 | Birch | G06Q 10/087 705/28 |
| 2014/0100769 A1* | 4/2014 | Wurman | G06Q 10/087 701/301 |
| 2014/0214234 A1* | 7/2014 | Worsley | G06Q 10/087 701/2 |
| 2015/0032252 A1* | 1/2015 | Galluzzo | B25J 5/007 700/218 |
| 2015/0073589 A1* | 3/2015 | Khodl | B25J 5/007 700/218 |
| 2015/0088302 A1* | 3/2015 | Mountz | G06Q 10/087 700/216 |

FOREIGN PATENT DOCUMENTS

| | | |
|---|---|---|
| EP | 2 711 880 A1 | 3/2014 |
| EP | 2 745 982 A2 | 6/2014 |
| JP | 2000 001300 A | 1/2000 |

\* cited by examiner

MATERIAL LOGISTICS SYSTEM

CROSS-REFERENCE TO RELATED APPLICATIONS

This application is a continuation of Application No. PCT/EP2014/075878, filed Nov. 27, 2014, and which is incorporated herein by reference.

FIELD OF THE INVENTION

The invention relates to a material logistics system for coordinating the transfer of production material so that production material is available as needed at production stations of a manufacturing facility, in particular a series production facility.

BACKGROUND OF THE INVENTION

Material logistics systems of this type are known from the prior art, and are used to ensure the material flow for interruption-free production of products. Such systems, for example and in particular, are a component of a higher-level system, which may be a product planning and control system, for example.

Thus, in series production in the automotive field, for example, it is necessary to ensure a preferably continuous manufacturing sequence or corresponding continuous production processes. For this purpose, the production materials in question must be provided at the correct production stations in the required amounts at the right point in time, in particular to avoid unnecessary storage at the individual production stations, which is associated, among other things, with corresponding space requirements as well as an undesirable capital commitment.

Production material may be made up of individual product components or parts that are necessary for manufacturing products.

The above-mentioned product components may in particular be, for example, intermediate products, subassemblies, individual components, and the like. In addition, the above-mentioned components may be parts, standard parts, or individual parts. For short, the term "material" is also used synonymously below for the term "production material."

Products are understood in particular to mean intermediate products that are used as a component or also an auxiliary for further products, as well as products of any type which, for example and in particular, may be manufactured in single-item production or also according to the product series principle or the modular principle.

Material logistics systems in the automotive field, among others, represent fields of application for material logistics systems of the type in question, since in the automotive field large quantities of production material are used that are necessary for the production of vehicles and their components.

The production material used in the series production of motor vehicles is often classified into A, B, and C elements, the C elements involving bulk material without particular value. For economic reasons or due to limited space, in particular C elements, which may be, for example, screws, nuts, disks, plates, or the like, are generally provided not individually, but, rather, in containers, which may also be referred to below as receptacles. The containers in each case generally contain a large number of identical production materials or parts.

The material logistics systems within the scope of the invention have a transport means, that is a transport, for transporting containers from the container storage area, in which containers for the production material are stored, to the storage racks. The transport takes place, for example and in particular, in such a way that a transport vehicle is loaded with filled containers at a picking station, also referred to as a "train station" or "supermarket." After loading, a driver drives the transport vehicle to the particular location where there is a need for material, and at which a container carried on the transport vehicle is to be placed in the storage rack.

A logistics specialist such as the aforementioned driver or a worker, among others, carries out the placement of containers in the storage rack, and at the same time takes the empty container provided on the storage racks. After delivering all containers, the logistics specialist drives the transport vehicle back to the picking station, so that the transport vehicle may be reloaded with filled containers and the operation may be repeated.

In many cases, the transport from a storage facility, in which the production material in question is stored, to a production station takes place by means of so-called driverless transport vehicles, which, via control by a material logistics system, for example and in particular ensure the transfer of production material between a storage facility and a production station. The basic design of a driverless transport vehicle is known, and therefore is not explained in greater detail below.

Production downtimes, caused by lack of production material, for example, may result in high downtime costs, depending on the duration of the downtime. Therefore, material logistics systems of the type in question are used, among other things, to ensure that production stations are supplied with production material in a timely manner and in the correct quantities.

OBJECTS AND SUMMARY OF THE INVENTION

The underlying object of the invention is first to provide a material logistics system by means of which the processes for providing production material to the individual production stations are simplified and more reliable.

This object, and other objects, is achieved by the invention set forth herein.

Another object of the invention is to provide a material logistics system which overcomes the drawbacks of the prior art.

For the simplified and more reliable design of a material logistics system, the invention in first instance takes the inventive approach of further automating the logistical chain in the provision of containers (also referred to below as container supply) to the individual production stations or storage racks.

For this purpose, according to the invention it is provided that the transport has at least one driverless transport vehicle (also referred to below as DTV for short), and that the DTV is configured and designed in such a way that containers are automatically suppliable to the storage racks in question.

The material requisition and redelivery are further automated in this way. For example, the driverless transport vehicle may be loaded at a picking station with containers that contain the material that is needed at various production stations in the material logistics system. After loading, the DTV automatically drives to the particular production stations, where the particular required containers are automatically supplied to the storage rack in question. Errors resulting from a mistake by the logistics specialist in question during a manual delivery of containers to the storage racks are avoided in this way. In addition, the process reliability of a material logistics system according to the invention is thus significantly increased.

Another advantage of the invention is that it is possible to avoid or at least reduce interruptions in production due to no material being available at certain locations in the production process on account of errors in the logistical chain of material requirements planning. This advantage is particularly important in series production, for example assembly line production of motor vehicles.

Driverless transport vehicles or driverless transport systems (encompassed below by the acronym DTV for short) provide a robust and efficient transport infrastructure that is readily also suited for use in series production, for example in the automotive industry.

As a result of the material transport to the storage racks taking place in a driverless manner within the scope of the invention, significant savings in personnel costs may be realized, so that the capital costs for such a system may be amortized relatively quickly.

The invention thus makes a significant contribution toward increasing the automation in material logistics systems for the series production of motor vehicles in particular.

The DTV provided according to the invention also provides options for further increasing the degree of automation in series production of motor vehicles. With an appropriate configuration of the picking station or the picking zone (container storage area), it is possible, for example, to also automate the transfer of filled containers to the DTV. In this way, the logistical chain in the material requirements planning and redelivery may be further automated, so that the process reliability as well as savings on personnel costs may thus be further increased.

Accordingly, the subject matter of the invention further relates to a DTV according to the invention, and to the use of a DTV in a material logistics system for the series production of motor vehicles in particular, the material logistics system having at least one production station with which at least one storage rack is associated.

In this regard, within the scope of the invention a production station is understood to mean a portion of a manufacturing facility or production line in which a workpiece, which may be a product or intermediate product, or component, receives added value, for example by having production materials added to it, or being machined. Production stations of this type are also referred to as assembly stations, among other terms.

For determining the need for production material at a particular production station, a plurality of sensors for sensing a production material supply at the production stations is provided, via which a production material supply may be sensed, or derived from the corresponding sensor data. In addition, the sensors assist with an automated or partially automated transfer of a production material or container between a transport rack, associated with the DTV, and a storage rack for production material.

In this regard, the plurality of sensors is used for generating signals, by means of which conclusions may be drawn concerning the production material supply or the need for production material for production stations.

For this purpose, the sensor data generated by the sensors, among other information, are relayed as output signals to a central unit of the material logistics system in order to be able to obtain therefrom various data for the production operations as well as logistics, including the logistics for the production material.

Accordingly, within the scope of the invention, sensors are also provided that are used for assisting with transfer of the containers between the transport rack and the storage rack. The output signals of these sensors do not necessarily have to be transmitted to the central unit, and instead may also be evaluated at the particular location in order to be able to initiate actions based on these output signals.

In one further embodiment, the invention therefore provides that sensors are provided which generate at least one output signal that is transmittable wirelessly, in particular via radio, or via a wired connection, to at least one central unit.

It is preferred that the particular output signal of a sensor in question is automatically transmitted to the central unit of a material logistics system according to the invention, at which the particular requirements planning for providing production material may take place centrally for production processes. If the central unit determines, for example and in particular, that production material is required at a location in the production process, a container containing this needed production material may be brought to the location in question.

The transport of the containers may also be triggered by an operator, who is notified of the particular need by the central unit. However, it is also possible according to the invention for the transport of containers to take place automatically with control by the central unit.

Within the scope of the invention, a material logistics system according to the invention has at least one central unit which is in signal-transmitting connection with the plurality of sensors, and which, on the basis of the output signals transmitted from the sensors, determines logistics data relating to the production material for the particular production station in order to be able to determine a need for production material for the particular production station.

For this purpose, control signals for the transfer of production material are generated, using the logistics data for the provision of production material, and are usable, for example and in particular, for further data processing in additional processing units, and are or may be correspondingly provided to same.

Furthermore, the central unit, by means of the logistics data, controls at least one driverless transport vehicle, having a transport rack that includes at least one transport level, for transporting production material accommodated in containers for an at least partially automatic container transfer between the transport rack and the storage rack of the at least one of the production stations. Within the scope of the invention, the container transfer is possible unidirectionally as well as bidirectionally, and may therefore take place from the transport rack to the storage rack, and from the storage rack to the transport rack.

The problem with these types of material logistics systems known thus far is due in particular to the fact that providing production material to production stations still requires a high level of corrective measures; for example, during the container transfer between the driverless transport vehicle and the particular storage rack of the production station, problems may arise which require time-consuming corrective measures.

A correction may sometimes be made solely by using personnel, thus tying up resources for the corrective measures. In addition, it is possible to bring an available supply of production material to the particular production station during performance of the corrective measures, thus disrupting the production operations.

Therefore, a further object of the invention is to provide a material logistics system which allows problem-free transfer of production material, or a container transfer from the driverless transport vehicle to the production station, and which thus significantly reduces or limits to a minimum the risk of problems during the container transfer.

The aforementioned object is achieved by the invention in that at least one driverless transport vehicle is provided which has at least one raising/lowering apparatus for at least partially adjusting the height of the transport level in order to compensate for a height difference between the transport level and the storage level of the storage rack associated with it for the container transfer.

To this end, the invention allows semiautomatic or automatic compensation to be made, based on height differences between a storage level of a storage rack of a production station in question provided for the container transfer, and a corresponding transport level of the transport rack of a driverless transport vehicle for the container transfer, from which production material is to be supplied to the storage level.

Within the scope of the invention, it is likewise provided that at least two transport levels are or may be situated next to one another in the vertical direction on the DTV, or that at least two transport levels are situated on top of one another in the horizontal direction on the DTV.

Thus, with an appropriate design of the DTV, a large number of containers may be transported which may be situated one behind the other at the individual positions on the transport levels, and, depending on the arrangement of the transport levels, may also be situated next to one another and on top of one another. In principle, the number of containers transportable by means of a DTV is thus limited by the dimensions of the DTV.

In order to keep the friction between the container base and a transport level as low as possible during the movement of a container relative to the transport level, and thus facilitate delivery of the container, a further embodiment the invention provides that at least one transport level is designed as a roller conveyor.

In the same way, a storage rack may be designed so that it may have, among other features, multiple storage levels that may be arranged on the storage rack analogously to the arrangement of the transport levels on the transport rack. Likewise, within the scope of the invention it is provided that at least one storage level of a storage rack is designed as a roller conveyor. In this way, the advantages according to the invention also extend to a storage rack.

The invention results, firstly, in the advantage that the cost-effectiveness of a material logistics system is increased in that the in-plant processes for ensuring a sufficient material supply to the individual production stations of the manufacturing facility may be ensured, whereby in the manufacturing facility, the container transfer between a driverless transport vehicle and a storage rack for the production material provided at the particular production station may advantageously be significantly reduced. Within the scope of the invention, a storage rack may be associated with one production station or also multiple production stations. In most cases, however, a storage rack is associated with one production station. In addition, within the scope of the invention a production station may also have multiple storage racks.

Among other things, a container storage area for storing containers is provided within the scope of a material logistics system that is formed according to the invention. It is also encompassed by the invention that the aforementioned storage racks, from which containers are removable by workers, are situated at a distance from an aforementioned container storage area.

For better removal, the storage racks have, for example and in particular, at least one storage level that is inclined or inclinable with respect to a horizontal plane, in principle it being possible to arrange a plurality of containers one behind the other on a storage level (inclined or noninclined), and the storage racks typically have containers that are situated on the same storage level and contain the same parts or the same production material.

During the particular production operations, for example and in particular the production material is initially removed from a container that is at the front in the direction of inclination of the storage level. When this container is completely emptied, it may be removed from the storage level, so that containers situated behind it slide down. Alternatively, it is also possible for a worker to remove a container that is still full from the storage level, so that containers situated behind it may in turn slide down.

The production material requirements planning takes place at a central unit or optionally multiple central units. One method for reporting material supplies to the individual storage racks is, for example, for a card for material requirements planning to be associated with each storage rack. A worker or logistics specialist checks at regular intervals at the individual storage racks whether sufficient material is still available. If this is not the case, the worker or logistics specialist removes the card, which is then taken to a central unit at which the material requirements planning takes place. Within the scope of the material requirements planning, the appropriate material may then be redelivered to the particular location as needed.

Within the scope of the invention, a height difference is understood to mean a deviation between a height setpoint value, which the transport level of the transport rack should have for the container transfer from the transport level in question to the storage level of the storage rack in question, and an actual value that is determined by the height of the transport level of the transport rack in question that results when the particular driverless transport vehicle is in the transfer position. According to the invention, for this purpose the height difference is determined in a transfer position of the driverless transport vehicle.

Furthermore, within the scope of the invention, the feature descriptions for the aforementioned height adjustment basically refer to a transfer position of a driverless transport vehicle, as described in greater detail below.

Within the scope of the invention, a transfer position is understood to mean an arrangement of the driverless transport vehicle at a storage rack for the container transfer between the driverless transport vehicle and the storage rack of a production station in question.

According to the invention, a height difference is to be compensated for, for example and in particular, when the magnitude of the aforementioned height difference has an impermissible value that endangers or prevents a container transfer between the storage rack and the transport rack. According to the invention, the heights and the aforementioned height difference are in the vertical direction.

Furthermore, within the scope of the invention a container may be filled with production material, partially filled, or empty.

According to the invention, in addition to a joint height adjustment of all transport levels of a transport rack of a driverless transport vehicle, it is also possible to adjust individual transport levels of the transport rack separately, and also to adjust multiple transport levels together in combination.

It is likewise possible to adjust the height of the transport levels in groups, whereby the group may be made up of an arbitrary number of transport levels of a driverless transport vehicle.

There are numerous options for the height adjustment and combinations with one another, so that the aforementioned listing is not exhaustive.

Downtimes during the manufacture of products or workpieces may be reduced by means of a material logistics system according to the invention. In addition, it has advantageously turned out that the flexibility in the usability of a driverless transport vehicle having a transport rack situated thereon may be increased according to the invention.

Thus, it has been shown that the individual transport levels of a transport rack in question may be adjusted in height separately, as well as differently from one another, i.e., flexibly. In addition, it is possible to configure and arrange at least one transport level or also multiple or all transport levels of the transport rack to be height-adjustable. Furthermore, is possible to couple two or more transport levels to one another for the height adjustment. To this end, numerous applications in the use of a driverless transport vehicle according to the invention, and the transport rack that it carries, advantageously result.

The required height adjustment for compensating for a height difference in question may be achieved in various ways. According to the invention, the adjustment may take place in the vertical direction, for example and in particular utilizing the weight force, so that in principle, no active drive is needed for an adjustment in this direction.

For a height adjustment, one advantageous further embodiment of the invention provides that, for compensating for a height difference between at least one transport level and a storage level associated with it for the container transfer, the raising/lowering apparatus for the container transfer between the transport rack and the storage rack adjusts, at least partially, the height of a body of the driverless transport vehicle.

For this purpose, the design of a driverless transport vehicle or of the transport rack that it carries is advantageously not subjected to new requirements. This is due to the fact that the body of the transport vehicle has a height-adjustable design.

The height adjustment may take place, for example, between a wheel suspension and a wheel, mounted thereon, of a driverless transport vehicle in order to be able to raise and lower the further structure of the driverless transport vehicle as well as the transport rack that it carries.

Within the scope of the invention, a raising/lowering apparatus may basically be designed in various ways. Thus, for example, it is possible to use a so-called scissor lift gear mechanism, which may be driven, for example, using at least one toothed rack or a threaded spindle.

Moreover, instead of a toothed rack gear mechanism or threaded spindle gear mechanism it is possible, to use, among other elements, a linear drive that is achievable, for example and in particular, utilizing at least one hydraulic cylinder. For this purpose, the hydraulic cylinder may in turn be operated manually or also by means of a hydraulic unit in order to bring about a height adjustment.

In addition, raising and lowering of the transport rack or the transport level in question may also be achieved in that a hydraulic cylinder is configured to be linearly movable, and is situated on the driverless transport vehicle, in such a way that raising the driverless transport vehicle in direction away from the floor as well as lowering it in the direction toward the floor is made possible. The driverless transport vehicle, in particular in the transfer position, is supported on the floor and moves thereon.

Consequently, when there is a height difference, the transport levels of the transport rack of a driverless transport vehicle jointly undergo a height adjustment. This may take place, among other ways, by utilizing reference points on the storage rack or on the transport rack in order to determine a height difference.

It is likewise possible to bring about a height adjustment of the transport level(s) by means of a height adjustment of the body of the driverless transport vehicle and also by means of a height adjustment between the body and the transport rack of the driverless transport rack.

In this regard, a height adjustment, also in a combination of various types of height adjustment, is possible, for example and in particular, by adjusting the height of the transport rack with respect to the body of the driverless transport vehicle, or also by adjusting the height of the body of the driverless transport vehicle, together with the transport rack, with respect to the floor.

In addition, it is likewise possible to make a height adjustment in combination with the various options for the height adjustment of transport levels, as mentioned above in part.

According to the invention, the height adjustment may also advantageously act on partial areas of the driverless transport vehicle, provided that this is possible, so that the driverless transport vehicle is adjusted on one side, for example, while the other side of the driverless transport vehicle remains unadjusted. It is thus possible to slope the individual transport levels of the transport rack with respect to the horizontal, resulting in an inclined plane, as the result of which a container transfer of the production material from a transport rack may also take place utilizing the force of gravity, so that additional drives for the container transfer are unnecessary.

In this regard, it is likewise possible to adjust the height of the transport rack in order to make a height adjustment of the at least one transport level of the transport rack. This may also take place in combination with a height adjustment of at least one transport level of the transport rack.

In another advantageous further embodiment of the invention, it is provided that, for compensating for a height difference between the transport level and a storage level associated with it, the raising/lowering apparatus for the container transfer between the transport rack and the storage rack adjusts the height of at least one transport level or of the transport rack on the side facing, or facing away from, the storage rack in the transfer position.

This also results in the advantage that an inclination of the transport level with respect to a horizontal plane is likewise achievable via the raising/lowering apparatus. This inclination of the transport level may be achieved in that, after a height adjustment, there is a height difference between a side of the transport level facing the storage rack in the transfer position and a side facing away from the storage rack. As a result, the transport level for the container transfer forms a slope, so that a container transfer may take place under the action of the force of gravity. Drive apparatuses for the container transfers are therefore unnecessary, which in turn results in cost advantages.

In addition, this results in the advantage that a rapid adaptation to a transport level is made possible. Furthermore, there is the advantage that smaller drives for the height adjustment may possibly be provided. To this end, it is likewise provided that at least one, all, or only a number of transport levels of a transport rack optionally has/have a height-adjustable design, as already described above.

Further advantages of a material logistics system according to the invention result in particular due to the fact that a height adjustment of at least one transport level of a transport rack is automated, so that manual interventions for the height adjustment for the container transfer may be dispensed with.

To this end, in another advantageous further embodiment of the invention it is provided that a control apparatus is provided for controlling the raising/lowering apparatus for a fully automatic or semiautomatic height adjustment.

According to the invention, due to the control apparatus the height difference for the container transfer may be detected by a sensor in order to thus automatically initiate a height adjustment of the driverless transport vehicle or at least one transport level in question, or the transport rack itself.

To reduce the data transfer between the central unit of the logistics system according to the invention and the driverless transport vehicle, it is advantageous for the control apparatus for controlling the raising/lowering apparatus to be carried along with the driverless transport vehicle, and accordingly situated thereon.

To this end, in another advantageous further embodiment of the invention it is provided that the control apparatus is situated on the driverless transport vehicle, as the result of which the latter appropriately controls or regulates operations for a fully automatic or semiautomatic height adjustment.

In this regard, according to the invention the term "control" is also understood to mean "regulation" to be able to control or regulate the operations for adjusting the height of the transport level(s) of a transport rack of a driverless transport vehicle.

In another embodiment of a material logistics system according to the invention, for further improving a height adjustment it is provided that the control apparatus has a sensor for sensing a height difference between the transport level of the transport rack and the storage level of the storage rack, associated with the transport level, for the container transfer. According to the invention, the aforementioned sensor is a first sensor, which is also referred to below as "sensor" or "control apparatus sensor" for short. To this end, an additional sensor (a second sensor, for example) is also described below.

According to the invention, by means of the above-mentioned (first) sensor, features are detected, based on sensor output signals that are available to the control apparatus, which is in signal-processing connection with the sensor, for further processing, on the basis of which a height difference is determinable.

According to the invention, measuring sensors are not absolutely necessary for the height adjustment. Thus, for example, sensors that sense by contact may also be used which sense by contact the deviations in, or the reaching of, a desired height level of the transport level. This is also encompassed by the term "electromechanically operating sensor" below.

Against this background, another advantageous further embodiment of the invention provides that the sensor has at least one electromechanically operating sensor with at least one probe that contacts the storage level of the storage rack, associated with the transport level of the transport rack for supplying the container, or contacts the storage rack, in order to determine the height difference.

For example and in particular, such an electromechanically operating sensor may be designed according to the example of an electromechanically operating sensor known from DE 20 2007 01 2926 U1.

According to the invention, firstly the storage level associated with the transport level in question for a container transfer may be contacted by means of an electromechanically operating sensor, as mentioned above. This may take place in such a way that when contact by the aforementioned sensor is successful, conclusions are drawn that the transport level in question is at the desired height for the container transfer, and consequently there is no height difference, or the height difference is within tolerable limits for the container transfer.

Against this background, a height adjustment may be made dependent on whether a probe of an electromechanically operating sensor senses a resistance.

In this regard, for the case that an electromechanically operating sensor is not able to contact the storage level in question, conclusions may be drawn that a height difference is present, so that a height adjustment of the transport level(s) in question or of the transport rack for the container transfer, or of the container transfer, is necessary.

For contacting, the electromechanically operating sensor may be situated, for example and in particular, on one, on each, or also on all transport levels in question.

Furthermore, within the scope of the invention it is possible to situate an electromechanically operating sensor on the transport rack or on the driverless transport vehicle, for example and in particular in order to be able to draw conclusions concerning a height difference based on reference points.

Alternatively or additionally, it is possible to appropriately situate electromechanically operating sensors on storage racks so that an electromechanically operating sensor is situated in each case on one or all storage level(s) or on the storage rack.

However, this option is more complicated compared to the above-mentioned placement options, since for a particular function, each production station must be equipped with electromechanically operating sensors.

In addition to electromechanically operating sensors, within the scope of the invention it is likewise provided to provide sensors whose mode of operation is based on operating principles different from those mentioned above.

To this end, in the aforementioned further embodiment of the invention it is likewise provided that the sensor has at least one optically operating sensor that optically detects optically detectable features in order to determine the height difference.

An optically operating sensor is understood to mean, among other things, a sensor that allows contactless scanning via optical detection. Such optically operating sensors are also referred to as optical sensors, among other names, and are known from DE 10 2013 103 273 A1, for example.

Such optical features may result, for example and in particular, from the arrangement or design of the components of a transport rack or a storage rack. In addition, optical characters may be provided on the supply signal or the transport rack which are detected by an optically operating sensor for purposes of height adjustment, in order to be able to draw conclusions concerning a height difference, based on the particular output signals of the sensor. For example and in particular, an optically operating sensor may be designed in the manner of a light sensor or an optical proximity switch.

Furthermore, in the above-mentioned further embodiment of the invention it is provided that the sensor has at least one capacitively operating sensor that senses a change in capacitance in order to determine a height difference.

The mode of operation of capacitively operating sensors, also referred to as capacitive sensors, is based on detecting a change in the capacitance of an individual capacitor or an entire capacitor system. The change in capacitance may take place in various ways.

The mode of operation of capacitively operating sensors is fundamentally based on determining a change in capacitance of plates, designed as electrodes, of an electrical capacitor.

Various types of capacitively operating sensors exist, for example and in particular the following:

Capacitively operating pressure sensors, in which the sensor principle is based, for example and in particular, on a change in capacitance due to bending of a diaphragm and an associated change in the distance between spaced-apart plates of the plate capacitor.

Capacitively operating distance sensors whose functional principle is based on detecting a change in capacitance due to a relative movement between two surfaces.

Capacitively operating proximity switches whose functional principle is based on detecting a change in an electrical field in the surroundings of a sensor electrode.

Capacitively operating sensors are also known from DE 20 2014 102 022 U1, for example.

The above-mentioned embodiments of sensors merely constitute a nonexhaustive selection of functional principles of sensors that are usable according to the invention.

According to the invention, any suitable sensor principles may also be combined with one another in order to sense a height difference between a transport level and a storage level.

The driverless transport vehicle in question is basically in a transfer position for determining the height difference, as already described above.

After a height difference is determined, a height adjustment may begin, in that the height adjustment takes place between a lower height value and an upper height value. In this regard, it is possible according to the invention to make the height adjustment between an upper height position and a lower height position for one, multiple, or all transport level(s) of the transport rack of a driverless transport vehicle until the height difference has a value of zero or is within a tolerance range that is not critical for the intended container transfer.

For the transfer of production material or a container between a transport level of a transport rack and a storage level in question that are intended for the container transfer, the weight force of the particular production material may be utilized for its container transfer in order to reduce the level of effort.

To this end, the invention provides a corresponding orientation or arrangement of the transport level and storage level. By use of the raising/lowering apparatus, it is possible according to the invention to adjust the height(s) of one transport level or multiple transport levels independently as well as jointly, as already described above.

Due to the partial height adjustment of the aforementioned transport level(s) of a driverless transport vehicle in question which is possible according to the invention, it is possible to incline the transport level(s) with respect to a horizontal plane, so that a drive-free container transfer is made possible by utilizing the weight force of the particular container.

In this regard, in another advantageous further embodiment of the invention it is provided that for compensating for the height difference, the raising/lowering apparatus adjusts the height of a first side of the transport level of the transport rack that faces the storage level of the storage rack, associated with the transport level, for supplying the container, with respect to a second side of the transport level of the transport rack that faces away from the storage level of the storage rack, associated with the transport level, for supplying the container.

Thus, according to the invention, after the transport level in question is adjusted in height, it has an inclination, at least in sections, with respect to a horizontal plane.

This results in various advantages in secure transport of the production material as well as advantages in the technical and energy expenditures for the container transfer.

A raising/lowering apparatus may be implemented according to the invention by utilizing various operating principles. Thus, for example, a scissor lift gear mechanism may be used for implementation thereof in order to bring about raising and lowering of a transport level.

In addition, spindle drives/gears or linear drives/gears may be used for the implementation, which may be produced using, among other elements, pneumatically or hydraulically actuatable cylinders that are telescopically movable relative to one another. Furthermore, it is possible to make a height adjustment using levers or a lever gear mechanism.

It is likewise possible according to the invention to use lifting devices which allow raising and lowering and which are implementable utilizing various operating principles. In addition, within the scope of the invention, various operating principles may also be used in combination with one another to implement a raising/lowering apparatus.

Various implementation forms may be used within the scope of the invention for route planning or guidance of the driverless transport vehicles used. According to the invention, it is thus possible, for example, to use guide paths, provided on the floor or also beneath the floor surface for the route planning or guidance, for the purpose of routing driverless transport vehicles.

It is thus possible according to the invention to use various types of position determination and routing for a driverless transport vehicle. For example and in particular, according to the invention optical guide paths or guide lines that are applied on or near the floor for the route planning or guidance are used for specifying a route for the driverless transport vehicle.

The same applies for guide paths that are situated beneath the floor surface. Within the scope of the invention, various types may basically be used for the routing of a driverless transport vehicle. Thus, the routing may, for example and in particular, take place inductively using a physical routing line, by predetermining the route for driverless transport vehicles by means of wire loop(s), situated in/on the floor, through which (alternating) current flows, and which for the routing are detected by an antenna/antennas or sensors mounted on the driverless transport vehicle.

Furthermore, the routing control may take place passively-inductively by means of at least one metal strip that is situated on the floor.

To increase more flexible routing and to reduce the installation and maintenance effort, in another advantageous further embodiment of the invention it is provided that for its position finding and routing, the driverless transport vehicle has at least one receiver for receiving signals or data (representatively referred to below as signals) of at least one GPS-based position finding system.

In order to be continually informed of the particular position of a, or each, DTV, for example in a control center of the material logistics system, within the scope of the invention a means for displaying at least one DTV may also be provided.

Disturbances that occur, for example, due to the travel path of a DTV being blocked may be quickly recognized and eliminated in this way. If a DTV experiencing a disturbance is blocking the travel path, for example control software of the central unit may indicate alternative travel paths for further DTVs. It is also possible according to the invention to provide an "emergency DTV" which, in the event of a disturbance, for example immobilization of a DTV, is used instead of the immobilized DTV in order to deliver material to the required locations, optionally on an alternative travel path.

The transmission of position-finding signals for finding the position of a driverless transport vehicle takes place by means of radio signal transmission, so that the signals from the GPS-based position finding system may be provided at least unidirectionally to the driverless transport vehicle. For utilization of the signals of the GPS-based position finding system, the driverless transport vehicle has a receiver which receives the data of the GPS-based position finding system and provides them in an appropriately modified form to a position determining unit in order to determine the position of the driverless transport vehicle, and the position determining unit determines the position of the driverless transport vehicle based on these data.

Based on these data, in turn the route planning or guidance of the driverless transport vehicle may be performed by comparing the position of the driverless transport vehicle to its destination coordinates. By use of the destination coordinates, points on the route may be established which the driverless transport vehicle appropriately contacts on the way to its predetermined destination. The predetermined destination is determined by the central unit for the driverless transport vehicle in question, based on the particular requirements for production material, and is provided to the driverless transport vehicle via radio. The driverless transport vehicle receives the aforementioned routing data via the receiver to be able to appropriately determine and carry out, based on these routing data, drive and steering motions via a driving control apparatus for the drive and steering apparatus of the driverless transport vehicle. According to the invention, the GPS-based position finding may also take place by means of radio signals or WLAN signals. GPS position finding and WLAN position finding are known technologies, and therefore their components and modes of operation do not require a more detailed explanation below.

With regard to the production material requirements planning, to simplify the reporting of production material supplies to the individual production stations it is known to use a so-called call button. A worker activates the call button as needed, for example when the next-to-last container has been removed from a storage level, so that a material requisition to the central unit is initiated, as the result of which the material that is running low may be delivered to the particular storage rack. Thus, by use of the call button, the reporting of a material requirement to the central unit of a material logistics system according to the invention is automated.

For example and in particular, within the scope of the invention a second sensor may sense the position of at least one container on a storage level of a storage rack. The particular sensor may be connected to the central unit via radio, for example, and thus automatically report a corresponding material requirement to the central unit of a material logistics system according to the invention. The request for containers is thus achievable with an increased degree of automation, and at the same time in a particularly reliable manner. Since the workers no longer have to make the request for containers, their work load is reduced.

Against this background, in a further embodiment the invention encompasses providing on at least one storage rack a sensor that senses whether a container is situated at a predetermined location of a storage rack.

According to the invention, this second sensor may have the same design as described for the first sensor. Therefore, it may have a design as described, for example and in particular, in DE 20 2007 0112 926 U1, the disclosed content of which is hereby incorporated in full into the present patent application.

According to the invention, the second sensor may sense whether a container is situated at a predetermined location in the storage level of a storage rack. However, according to the invention it is also possible to sense the presence of a container at a location of the storage rack situated at a distance from the storage level. For example, a procedure may thus be followed in which a worker deposits an empty container on a predetermined storage level or deposition surface on a storage rack, and the presence of a container on this storage level or deposition surface is sensed by the second sensor.

According to the invention, against the background of the above-described alternative or additional further embodiment of the invention, it is provided that the second sensor has at least one optical sensor. For example and in particular, the optical sensor may be designed in the manner of a light sensor.

Furthermore, within the scope of the invention it is provided that the sensor has at least one electromechanically operating sensor as already described above with reference to the sensor, so that reference is made to that location in the description for the sake of simplicity.

According to the invention, any suitable sensor principles may also be combined with one another in order to sense whether a container is situated at a predetermined location of the storage rack. In this regard, it is also possible according to the invention for the sensor to sense the presence of a container on a deposition surface situated at a distance from the storage rack.

In addition, according to the invention it is important only for a requirement for production material to be indicated by the presence or nonpresence of a container at a predetermined location.

Moreover, within the scope of the invention, a further embodiment provides that at least one storage rack has a storage level for containers, and that a probe of the electromechanically operating sensor of the second sensor protrudes into the storage level.

The presence of a container at a predetermined location of the storage level may thus be sensed in a particularly reliable manner. With regard to an underlying principle in this regard, reference is made once again to DE 20 2007 01 2926 U1.

In the same way, according to the invention the second sensor may also generate a requirement notification signal when a container is situated at the predetermined location.

The latter variant is particularly advantageous when the presence of a container, for example in the storage level of a storage rack, is sensed.

The variant in which a requirement notification signal is generated when no containers are situated at the predetermined location is advantageous in particular when the second sensor, for example, does not monitor a storage level of a storage rack, but, rather, monitors a predetermined unloading surface or transport level on which a worker deposits an empty container to indicate that there is a need for material.

In addition, in a further embodiment the invention provides that a storage level of a removal rack is designed as a plane that is inclined with respect to a horizontal plane. In this embodiment, a plurality of containers may be situated one behind the other on the storage level; whenever the frontmost container in the direction of inclination is removed from the storage level, a container situated behind same in the direction of inclination slides down due to the action of the force of gravity.

According to the invention, it is possible in principle for at least individual sensors of the first sensor and the second sensor to be in signal transmission connection with the central unit via a wired connection.

Against this background, the sensor used according to the invention may carry out signal transmission or signal reception via a wired connection, or also wirelessly.

For wireless signal transmission, in practice wireless networks based on WLAN wireless technology according to the IEEE 802.11 standard are used to a large extent for transmitting output signals from sensor modules or sensors to a receiver in a material logistics system for controlling and/or monitoring the inventory of a plurality of components in a manufacturing facility.

In this technical context, WLAN technology would therefore clearly appear to be advantageous due to the fact that a WLAN infrastructure is present anyway in many companies. The invention departs from this concept, and instead is based on the finding that the use of WLAN technology in the technical context under consideration is disadvantageous.

The aim of the invention is likewise to provide a cost-effective approach for radio-based signal transmission. The underlying object is achieved by the invention in a surprisingly simple manner in that the radio module is designed as a low-power radio module having a maximum transmission power of ≤15 mW. Since such sensor modules are operated mostly using batteries, due to the use of a low-power radio module the battery life is increased significantly compared to WLAN networks, which frequently operate with a maximum transmission power of 100 mW. On account of the extended battery life, according to the invention the battery needs to be replaced much less frequently than with WLAN-based sensor modules. This results in a significant time savings for battery replacement in the sensor modules, and thus, considerable cost savings, which are more important the larger the number of sensor modules used.

Another advantage of the sensor module according to the invention is that, due to the less frequent need for battery replacement, the burden on the environment is reduced, since the replaced batteries must be disposed of as environmentally harmful hazardous waste.

According to the invention, a low-power radio module is understood to mean a radio module having a maximum transmission power of ≤15 mW, whereby the maximum transmission power referenced in this regard is the equivalent isotropically radiated power (EIRP).

To this end, a further embodiment of the invention provides that the radio module is designed for unencrypted data communication with the receiver. This further embodiment is based on the finding that in a WLAN infrastructure, due to the data encryption used, significant data overhead results with respect to the pure useful data, which represent, for example, sensor state information about the sensor; this data overhead greatly increases the transmission time and thus the power consumption, although in particular the sensor state information hereby transmitted has no use to third parties, and thus in principle does not require encryption. In this way the transmission time and thus the power consumption are further reduced, which is extremely important in particular when a large number of sensor modules is used.

Depending on the particular requirements, the radio module may be designed for transmission/reception operation in any suitable frequency band. One advantageous further embodiment of the invention provides that the radio module is designed for transmission/reception operation in an open frequency band.

In addition, in a further embodiment the invention provides that the radio module is designed for bidirectional data communication with the receiver. Thus, there is the option for a signal which is transmitted by the sensor module and which contains sensor state information, for example, to be acknowledged by a response signal from the receiver. Repeat transmissions of a data packet, which may be necessary during unidirectional data transmission, for example, are thus dispensed with. This likewise reduces the transmission time and thus, the power consumption.

The concept according to the invention of departing from a WLAN architecture also allows use of proprietary protocols for the data transmission, which reduces the data overhead with regard to the specific application to a minimum. In this regard, in a further embodiment of the invention it is provided that the radio module is designed for transmitting sensor state information to the receiver in a data packet having a length of 20 bytes. Only very short packets are thus necessary for transmitting sensor state information, which in turn reduces the transmission time for transmitting sensor state information and thus has a positive effect on the power consumption.

The operating principle of the sensor of the sensor module according to the invention is selectable corresponding to the particular requirements. In this regard, other further embodiments of the invention provide that the sensor may be as described above. The type of signal transmission described above may be used with the aforementioned sensors to achieve radio-based signal transmission, in particular of the output signals of the particular sensors.

According to the invention, it is possible in principle to operate the sensor module by means of a power supply. In this regard, one further embodiment provides that the sensor module is battery-operated. In this embodiment, the sensor module may be placed at any suitable location in the manufacturing process, independent from a power supply.

To provide the arrangement of sensors of the second sensor on the storage racks with a particularly flexible design, in a further embodiment the invention provides that the sensor generates a requirement notification signal when a container is situated at the predetermined location, the requirement notification signal being transmitted or transmittable wirelessly, in particular via radio, to a central unit for material requirements planning.

To establish whether a load carrier, which for example and in particular is a container, is present at a certain location, for example and in particular in one of the aforementioned racks (preferably a storage rack), in a further embodiment according to the invention the second sensor includes least one force sensor for sensing the presence and/or the weight force of a load carrier, via which in particular the weight force of the load carrier is determined.

Since the empty weight of the load carrier, which in the description here and below is also referred to as a container, is known, it may thus be determined not only whether a container is situated at a predetermined location, but also the extent to which the container is still filled with production materials. In this way the supply of production materials may be controlled in a particularly precise manner, so that a sufficient supply of production materials may always be ensured.

One particular advantage of a sensor module according to the invention having at least one of the above-mentioned sensors is that the sensor module has a relatively simple and inexpensive design. Suitable force sensors are available as relatively simple and inexpensive standard parts. The sensitivity of the force sensor may be selected within wide limits, depending on the weight of a container and the difference between the weight of a completely full container and the weight force of the same container in the empty state.

Depending on the particular application, force sensors may be used which are suitable for sensing a weight difference of a few grams between a container filled with production materials and an empty container, for example to determine the filling level of a small material container filled with foam parts. However, according to the invention it is also possible to determine absolute weights or weight differences in the range of several 100 kg or greater, for example to determine the filling level of a Euro pallet loaded with heavy production materials.

In a further embodiment, the invention provides that the sensor module, including the radio transmitter, is battery-operated. The sensor module according to the invention is thus completely independent of grid power sources, so that it may be used at any suitable location in a series production facility without having to provide a power connection at that location. In practice, this is a significant advantage, since providing a power connection is associated with relatively high costs, which are correspondingly multiplied when a large number of sensor modules is used. In combination with a force transducer, this results in a particular combined effect that force sensors require only very low control currents for reliable functioning, so that the power consumption is kept low, and the battery life is thus significantly increased compared to conventional sensor modules that use a laser or a camera, for example. This reduces the maintenance effort and the maintenance costs in particular when a large number of sensor modules is used.

In addition, in a further embodiment the invention provides that the radio transmitter is designed and configured in such a way that a signal transmission to the central control apparatus takes place at predetermined time intervals. In this embodiment, the radio transmitter regularly transmits a signal to the central control apparatus; in the simplest case, this signal may represent whether a container is present at a predetermined location. However, the signal may also contain data representing the weight force of the container, so that, based on the weight force transmitted to the central control apparatus, the filling level of the container may be determined. The transmitted signal may also be used, for example, for the sensor module to report its functionality at predetermined time intervals. If the sensor module is battery-operated, it is also possible to transmit data with the signal that represent the state of charge of the battery.

To this end, in another further embodiment the invention provides that the radio sensor is designed and configured in such a way that a signal that represents the weight force of the container is transmitted to the central unit when the weight force of the container is at or below a predetermined value. In this way, the filling level of a certain container, or the point in time when a redelivery of production materials is required, may be determined at the central control apparatus. A fully automatic request for production materials may be made in this way. Since, on the basis of the transmitted instantaneous weight force of the container (in comparison to the previously known weight force of an unfilled container), the filling level of the container, and thus how many components it still contains, can be precisely determined, particularly precise monitoring or control of the inventory of production materials is made possible.

The force transducer of the sensor module according to the invention may operate according to any suitable sensor principle. To this end, in one extremely advantageous further embodiment the invention provides that at least one force sensor is designed as a load cell. Such load cells are available as relatively simple and cost-effective standard parts, and allow a precise force or weight measurement. A load cell may contain a spring element, for example, which elastically deforms under the effect of the weight force of a container. This elastic deformation may be detected using strain gauges, for example, and converted into an electrical signal.

Another advantageous further embodiment of the invention provides that overload protection is associated with the force transducer. This prevents the force transducer from being damaged when an overload occurs, for example if an unexpectedly high static or dynamic load occurs.

In the aforementioned embodiment, the overload protection is preferably designed as passive overload protection. Within the meaning of the invention, passive overload protection is understood to mean that the overload protection is or becomes effective without a power supply. If, for example, a force transducer is used that operates according to the principle of a measuring body that is elastically deformable under the weight force of a container, the elastic deformation of the measuring body may be limited, for example, by a mechanical stop which thus provides passive overload protection.

The spatial arrangement of the force transducer of the sensor module according to the invention relative to a load carrier is selectable within wide limits. If, for example, the filling level of a pallet is to be determined, the force transducer may be situated beneath a component on which the pallet rests, so that the weight force of the pallet may be determined via the force transducer.

A further embodiment of the invention that is advantageous, in particular when small material containers are used, provides that an oblique plane is associated with the sensor module, and defines an operating path for containers, in particular small load carriers, wherein the force transducer or a component in force transmission connection with the force transducer protrudes into the operating path.

This embodiment takes into account the practical considerations for racks for the material supply of production materials in small material containers, as described above and also below.

As already discussed, it is standard practice for multiple small containers to be situated one behind the other on a transport level or storage level. When all production material has been removed from a small material container, for example and in particular the small material container may be removed from the storage level, so that a small material container situated behind it slides down. As described above, the operating path may be formed by a roller conveyor, for example. As a result of the force transducer, or a component that is in force transmission connection with the force transducer, protruding into the operating path, the weight force of a container situated in the operating path may be determined. At the same time, based on the determined weight, it can be determined whether, and in what number, even further containers are situated behind the container that is in contact with the force transducer.

Within the scope of the invention, the problem is likewise pursued of achieving rapid, simple integration of a sensor module into the spatial conditions of a manufacturing process in a series production facility.

This may be achieved according to the invention when a sensor module having at least one of the above-mentioned sensors may be fastened to a support quickly and easily, i.e., without complicated assembly operations.

A clamping device in particular is suitable for such quick, simple fastening to a support. On this basis, the invention provides a jamming protection means that is associated with the switching element, such that jamming of the switching element on a base body of the sensor module is prevented. This ensures the operational reliability of the sensor module, even when the base body of the sensor module has been distorted during installation of the sensor module on a support, which may occur in particular when a clamping device is used.

The operational reliability of the sensor module according to the invention may be even further increased in this way. By use of appropriate structural measures, the jamming protection means may be designed in such a way that its cost is not greater than, or is only marginally greater than, the cost of sensor modules without such a jamming protection means. In principle, a switch that is a component of a sensor module according to the invention and cooperates with the mechanically actuatable switching element may operate according to any suitable operating principle, for example in a design as an optical switch, as previously described with reference to the additional sensor. With regard to a simple, robust, and cost-effective design, a further embodiment of the invention provides that the switch is an electrical switch, in particular a limit switch. In particular limit switches are available as relatively simple and cost-effective as well as robust and reliable standard parts.

The movement of the mechanical switching element between its neutral position and its switching position may follow any suitable kinematics. For example, the switching element may have a linearly displaceable design. With regard to a particularly simple design and at the same time high operational reliability, another further embodiment of the invention provides that the switching element is designed in the manner of a pivot lever that is supported on the base body so as to be pivotable about a pivot axis.

The shape, size, material, and configuration of the base body are selectable within wide limits, depending on the particular requirements. With regard to the configuration of the base body, one advantageous further embodiment of the invention provides that the base body has two legs that are spaced apart from one another in the axial direction of the pivot axis, and between which the pivot lever is supported. The legs may be joined together, for example and in particular, by a central web, so that the base body is designed as a profiled element that is open on one side.

One advantageous further embodiment of the embodiment according to the invention having the legs provides that the jamming protection means has a spacer means that acts between the legs. In this embodiment, the jamming protection for the switching element is thus achieved by the legs being held at a distance from one another by the spacer, thus reliably avoiding a decrease in the spacing of the legs, which could result in jamming of the switching element.

To this end, within the scope of the invention a further embodiment provides that a switch housing for the switch is accommodated between the legs, and that the spacer means has webs with which the legs are supported on the switch housing. In this embodiment, the webs on the one hand act as spacers due to their being supported on the switch housing for the switch. On the other hand, the switch housing for the switch may be fixed by the webs. For example and in particular, the switch housing may be accommodated between the webs with clamping, so that an additional fastening means for fastening the switch housing to the base body may be unnecessary.

In the aforementioned embodiment, the webs in principle may be designed as additional components. To simplify the manufacture of the base body and thus make it more cost-effective, one advantageous further embodiment provides that the webs are molded onto the legs.

Molding the webs onto the legs is appropriate in particular when the base body is made of plastic, as provided by the invention in a further embodiment. The base body, for example and in particular, may be designed as an injection-molded part made of plastic.

The sensor module may be fastened to a support in any suitable manner. In this regard, a further embodiment of the invention provides a clamping device for a clamped fastening of the sensor module to a support. This embodiment thus makes use of the advantages of a clamping device, namely, rapid, simple, and detachable fastening to a support, whereby the jamming protection means provided according to the invention prevents jamming of the mechanical switching element, even when the base body of the sensor module is distorted by the clamping device during the fastening to the support.

Within the scope of the invention, it is likewise possible to combine components of a material logistics system with one another in order to unite multiple functions in one component. This is meaningful in particular for the above-mentioned sensor, sensors, and sensor modules when, for example, multiple parameters can be sensed in one operation.

A system according to the invention for semiautomatically or fully automatically controlling the supply of production material in a series production facility has already been discussed above. According to the invention, a material logistics system in question therefore has at least one aforementioned sensor module according to the invention. The use of a sensor module according to the invention for sensing the presence and/or the weight force of a container in a material logistics system for semiautomatically or fully automatically controlling the supply of production material in a series production facility is likewise encompassed by the invention.

According to the invention, for the material requirements planning the central unit of a material logistics system according to the invention may be formed, for example, by one (or also multiple, preferably data-linked) central computer(s). However, within the scope of the material logistics system according to the invention it is also possible according to the invention to use a separate central unit, for example a computer provided for this purpose, for the material requirements planning.

To this end, in a further embodiment the invention provides that a transport trip of a DTV is or may be carried out as a function of least one requirement notification signal of the second sensor and/or at least one inventory control signal of the central unit. In the first alternative, in which a transport trip of a DTV is initiated as a function of a requirement notification signal, a transport trip of a DTV always takes place when there is a material requirement at at least one storage rack. With an appropriate design of the control system, according to the invention it is of course possible and meaningful to carry out a transport trip only when a sufficient number of material requisitions are present, and consequently a larger number of containers is to be transported at the same time, but to make the transport trip in a timely manner so that no material bottleneck results at any storage rack. In the latter alternative, in which a transport trip of a DTV is carried out as a function of at least one requirement control signal of the central unit, the control of the DTV may be directly linked to the material requirements planning using software, and, based, for example, on an empirically determined material consumption in the production process, the particular inventory of production materials may be estimated during operation of the production process, a transport trip of a DTV being carried out when the estimate indicates that a material requirement exists or is imminent.

Against this background, the invention provides, with reference to the loading of a DTV, that a scanner means for scanning containers is provided in a loading area in such a way that containers are scanned before the DTV is loaded. In this way, on the one hand it may be determined which containers have been loaded onto a specific DTV. On the other hand, after a container has been detected by scanning, a logistics specialist who is loading the container onto the DTV may be provided with aids regarding the arrangement of the container on the DTV or the positionally correct loading of the DTV.

In a further embodiment of the aforementioned embodiment, the invention provides that the scanner means has at least one scanner for optoelectronically readable print, in particular a barcode. In this embodiment, each container may be provided with a barcode, for example, so that the containers may be scanned using a barcode scanner. One advantage of this embodiment is that such barcode scanners are available as relatively inexpensive and fail-safe standard parts, and corresponding barcode labels are likewise inexpensive and easily affixable to the containers. In a further embodiment, the invention also provides that the scanner means has at least one camera. In this embodiment, for example the contents of a container may be photographed with a camera, and based on a still or moving image, using image processing methods and pattern recognition, the particular contents of the container may be recognized. Depending on the result, it may then be determined in the above-described manner that a certain container has been loaded onto a DTV, or a logistics specialist who is loading the container may be provided with aids regarding the arrangement of the container on the DTV or the positionally correct loading.

To assist a logistics specialist, who is manually loading containers onto a DTV, with the positionally correct loading, in a further embodiment the invention provides a display means in the loading area for displaying a position on the DTV that is intended for the particular container. For example, the DTV may be depicted on a screen, for example a touchscreen, also in the form of a symbolic representation, for example, and after a container is scanned, the position of the particular container to be loaded may be displayed. Errors that are caused by faulty loading of the DTV may thus be avoided or at least reduced, thus further improving the process reliability.

In a further embodiment of the aforementioned embodiment, the invention provides that the display means has at least one touchscreen. After a container is loaded onto a DTV, the logistics specialist may, for example, confirm the loading on the touchscreen, so that the correct position on the DTV for a next container is subsequently displayed. The manual loading of a DTV is made more efficient in this way.

In addition, in a further embodiment the invention provides that the display means has at least one apparatus designed in the manner of a light pointer. In this embodiment, it may be indicated to the logistics specialist, for example by means of a movable light spot, the particular position on the DTV at which a scanned container is to be loaded. With regard to the loading of a DTV, another extremely advantageous further embodiment of the invention provides a locating means for automatically identifying and/or locating containers on the DTV. In this embodiment, the individual containers may be located after the DTV is loaded, so that it may be monitored whether the correct containers are present on the DTV, and/or whether the containers are present at the correct location on the DTV.

In a further embodiment of the aforementioned embodiment, the invention advantageously provides that the locating means has at least one camera and/or at least one scanner. In this embodiment as well, for example the loading state of a DTV may be checked, using a camera, based on a still or moving image and using image processing methods and pattern recognition.

In one extremely advantageous further embodiment of the embodiment having the locating means, the invention provides that the locating means has a reader for a transponder, in particular an RFID transponder, situated on the particular container. The detection and location of the containers is further simplified in this way.

According to the invention, the loading of a DTV in the picking zone may also take place manually. This has the advantage that the picking zone provided in a material logistics system does not have to be changed. Furthermore, however, the invention provides a loading means, such as a loader, in the loading area for semiautomatically or fully automatically loading DTVs with filled containers. In this embodiment, the loading of a DTV in the loading area thus also takes place semiautomatically or fully automatically, so that the degree of automation in the material logistics system according to the invention is further increased. The process reliability and the reduction in personnel work load are further increased in this way.

According to the invention, the travel path of a DTV or the travel paths of multiple DTVs is/are automatically controlled, and in this regard, in a further embodiment the invention provides that after a DTV is loaded, the central unit of a material logistics system according to the invention is controlled in such a way that the DTV travels from the loading position to a transfer position that is specified by the central unit for the container transfer between the transport rack and a storage rack. In this embodiment, for example a trip of a DTV may begin immediately when the loading (manual or automatic loading) is completed.

In a further embodiment, the invention also provides that the DTV has a delivery means for automatically delivering containers to storage racks in the transfer position of the DTV.

According to the invention, the delivery means may be controlled by a control system that is locally provided on the DTV, and for example a delivery operation may be triggered by the local control of the DTV when it is determined that the DTV is situated in front of a storage rack in a transfer position provided for this purpose. In addition, however, in one advantageous further embodiment the invention provides that the delivery means is controlled or controllable by the central unit. In this embodiment, the central unit thus also takes over the control of the delivery operation for delivering a container from a DTV to a storage rack.

In principle, the delivery means may be designed as an active delivery means, for example as a handling apparatus situated on the DTV. To keep the DTV simple and thus economical, and at the same time to keep the power consumption, which for a DTV is generally provided by a battery, low, in one advantageous further embodiment the invention provides that the delivery means is designed as a passive delivery means. According to the invention, a passive delivery means is understood to mean a delivery means which does not have its own drive, and which thus cannot independently deliver a container. For example and in particular, a passive delivery means may be formed by situating a container on a transport level that is inclined with respect to a horizontal plane, and delivering the container after appropriate release and the action of the force of gravity, as already discussed above.

In contrast, within the meaning of the invention an active delivery means has its own drive, and is thus able to independently receive and deliver a container. Such an active delivery means may be designed, for example, in the manner of a handling apparatus or as a load fork.

The containers to be transported on a DTV may be arranged in any suitable manner or configuration.

Within the scope of the invention, for this purpose it is provided that the delivery means on the DTV has at least one transport level on which containers are or may be situated one behind the other at at least two positions. The number of containers situated one behind the other in a transport level is limited only by the dimensions of the DTV.

In one advantageous further embodiment, the invention provides that associated with each transport level is at least one blocking element that is movable from a blocking position, in which a level in question (transport level, storage level) is blocked from delivering the containers, to a delivery position in which a level in question (transport level, storage level) is released for a delivery of the containers. This embodiment, for example in combination with the embodiment in which the transport level is designed as a plane that is inclined with respect to a horizontal plane, provides a passive delivery means that has only an extremely low power requirement for its actuation. The blocking element may be formed, for example, by an electromechanically actuatable bar which in the blocking position blocks a transfer path for the containers situated on the transport level or storage level, and for transferring the containers between the transport rack and the storage rack is electromechanically retracted, for example by means of an electromagnet. The drive for the blocking element is selectable within wide limits. When the blocking element is designed as a mechanical bar, a drive having only an extremely low power requirement may be used.

If a transport level of a DTV according to the invention is loaded exclusively in unmixed form, i.e., loaded with containers that contain the same production material or the same parts, according to the invention, in the aforementioned embodiment it is sufficient in principle for only a single blocking element to be associated with a transport level, so that all containers accommodated in the transport level are delivered together when the blocking element is moved into the transfer position. When all transport levels or at least one transport level are/is not in unmixed form, i.e., loaded with containers which contain different components and which therefore generally are not to be delivered together, in one extremely advantageous further embodiment the invention thus provides that a separating means for individually delivering containers from the transport level is associated with the transport level. It is thus made possible according to the invention to also deliver individual containers from the transport level. This is advantageous not only when loading of a transport level is not in unmixed form, but also when a plurality of containers is accommodated in a transport level, of which only one or more single containers is/are to be supplied to a storage rack, but the other container(s) is/are to be supplied to a different storage rack or storage racks.

To avoid or recognize disturbances that may occur during the container transfer between the transport rack and the storage rack, in a further embodiment the invention provides a third sensor that senses whether a delivery of a container to a storage rack has successfully taken place. For example and in particular, an optical or electromechanical sensor may be used to sense whether a container to be transferred has actually been situated between the transport rack and the storage rack, or is situated between the DTV and the storage rack, for example has become wedged. By use of an appropriate sensor system, such disturbances during operation of the material logistics system according to the invention may be quickly recognized and eliminated, thus further increasing the process reliability.

If a means for a semiautomatic or fully automatic container transfer to a DTV is provided in the container storage area, this means may be designed according to the particular requirements. To this end, in a further embodiment the invention provides that at least one supply level for transferring filled containers to at least one DTV is situated in the container storage area. Such a supply level may be designed and further embodied as described above for a transport level situated on a DTV.

According to the invention, it is possible to equip the DTV with an onboard control apparatus that controls in particular components of the DTV for accommodating and delivering containers. To design the DTV(s) used in a material logistics system in a particularly simple and cost-effective manner, a further embodiment of the invention provides that the components of the material logistics system involved in the provision, container transfer, and transport of containers are controlled or controllable by the central unit. In this embodiment, the control logistics system is relocated to the central unit, for example a central computer, provided this is possible, so that the control logistics system may be reduced to the extent possible to decentralized components or parts of the material logistics system.

To this end, within the scope of the invention it is likewise provided in a further refinement that at least one DTV is designed for accommodating empty containers on the storage racks. In this embodiment, the DTV(s) transport(s) not only filled containers to the storage racks, but also empty containers from the storage racks back to the container storage area, so that the logistical chain is completely closed, also with regard to the pickup and provision of empty containers.

In a further embodiment of the aforementioned embodiment, the invention provides at least one transport level on at least one storage rack for automatically delivering empty containers to a DTV. Such a transport level may be designed and further embodied as described above for a transport level situated on the DTV. The device-related infrastructure necessary for delivering empty containers to a DTV is thus designed in a particularly simple and cost-effective manner. As a result, such transport levels having essentially the same design may be used on a DTV (for delivering filled containers to a storage rack), as well as in a container storage area (for delivering filled containers to a DTV) and to a storage rack (for delivering empty containers to a DTV), so that in this regard the modules used are identical or very similar. The resulting modular design reduces costs in a material logistics system according to the invention.

According to the invention, the empty containers transported back by a DTV may in principle be unloaded manually from the DTV. To automate the logistical processes at this location as well, in one advantageous further embodiment the invention provides that a receiving means for fully automatically or semiautomatically receiving empty containers provided by a DTV is provided in an empty container transfer area.

The subject matter of the invention further relates to a method for operating a material logistics system for the series production of motor vehicles in particular, in which at least one DTV is used as described above to transport containers between a container storage area and storage racks, the DTV being configured and designed in such a way that containers are or may be automatically delivered to storage racks, and for this purpose the DTV has a raising/lowering apparatus as described above.

The subject matter of the invention further relates to the use of a DTV formed according to the invention for automatically transporting containers between a container storage area of a material logistics system and storage racks, and for automatically delivering containers to storage racks.

Provided that it is technically possible or meaningful, further embodiments of the material logistics system described in the context of the invention also relate to the DTV according to the invention, and vice versa.

When the word "a" has been used in the patent claims or in the preceding or following description, this involves an indefinite article, not a numeral; i.e., "one." Consequently, the components of the material logistics system according to the invention may be provided in any given number and configuration, depending on the requirements of the particular application.

The invention is explained in greater detail below with reference to the appended drawings, which show one embodiment of a material logistics system formed according to the invention as a representative example of a plurality of the possible forms.

All features claimed or described and illustrated in the drawings, alone or in any arbitrary combination, together constitute the subject matter of the invention, regardless of their recapitulation in the patent claims or their back-reference, and regardless of their description or illustration in the drawings.

The figures of the drawing show one embodiment of a material logistics system according to the invention, in each case in a schematic illustration. The illustrations, in particular with respect to one another, are therefore not true to scale, and for improved clarity are reduced to the elements/components/parts that assist in understanding.

Identical or corresponding components/parts or elements are provided with the same reference numerals in the figures. In addition, in the event of an identical or similar design, for improved clarity the description is reduced to the differences between the illustrations or figures.

Furthermore, components/parts or elements are not provided with reference numerals in all figures; however, the reference numerals may be correspondingly associated based on the representation which is the same or adapted to the view.

Moreover, based, for example, on the particular selected schematic representation which is reduced in detail for better understanding, the power supply of the components in question of a material logistics system is not shown in the figures. However, this as well as other components that are not illustrated may be deduced by relevant persons skilled in the art from their technical knowledge, without having to carry out inventive activity themselves.

Relative terms such as left, right, up, and down are for convenience only and are not intended to be limiting.

The figures show the following:

DETAILED DESCRIPTION OF THE INVENTION

Figure 1:
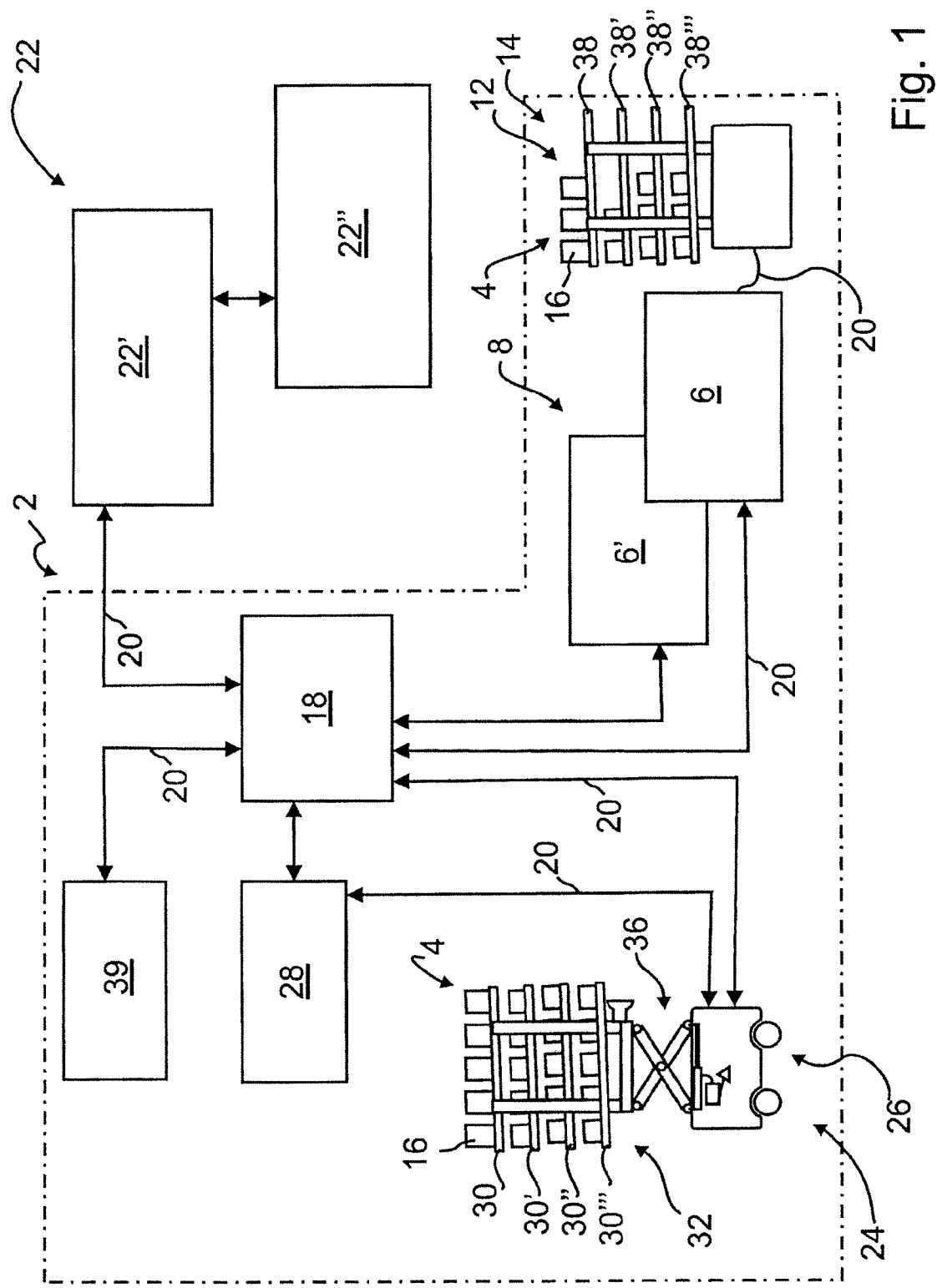
FIG. 1 shows one embodiment of a material logistics system according to the invention for coordinating the transfer of production material so that production material is available as needed at production stations of a manufacturing facility, in particular a series production facility, in a schematic topological view.

FIG. 1 shows one embodiment of a material logistics system 2 according to the invention for coordinating the transfer of production material 4 so that production material 4 is available as needed at production stations 6, 6' of a manufacturing facility 8, in particular a series production facility, also referred to below as a material logistics system 2 for short, in a schematic topological view.

For determining logistics data for the coordination of production material 4, the material logistics system 2 has a plurality of sensors 10, a portion of which are used for sensing a production material supply 12 at production stations 6, 6'. The sensors 10 are not illustrated in greater detail in FIG. 1.

The plurality of sensors 10 for transporting a production material supply 12 to a production station 6, 6' is situated, for example and in particular, on a storage rack 14 of production stations 6, 6'.

The production material 4 is basically provided using containers 16 of a particular production station 6, 6', and is stored in the containers in the aforementioned storage rack 14.

The containers are shown in the same representation in the figures, so that for each rack only one container is denoted by the reference numeral 16 for improved clarity.

For determining how much production material 4 is stored at the individual production station 6, 6', sensors (omitted) for sensing the number or weight of the containers 16 present at the particular production station 6, 6' are provided which are in signal transmission connection 20 with a central unit 18 for the data transmission and processing.

A signal transmission connection 20 between the components illustrated in FIG. 1 is depicted by means of polylines that are provided with the same reference numeral 20.

A signal transmission connection 20 may be unidirectional or also bidirectional, depending on the requirements for the signal/data exchange, and used for transferring data as well as signals, in particular control signals.

The central unit 18 of the material logistics system 2 is in signal transmission connection with the plurality of sensors; the central unit 18 determines logistics data concerning the production material 4 for the particular production station 6, 6', based on the output signals transmitted from the plurality of sensors 10, and generates control signals for the transfer of production material 4, using the logistics data.

In addition, the central unit 18 also provides logistics data to further data processing units 22, for example a materials management system and a planning and control system 22', 22"; the logistics data may be retrieved and exchanged with these systems unidirectionally as well as bidirectionally. Within the scope of the invention, the term "data processing units" is used synonymously with the term "data processing system," and encompasses same.

For this purpose, the material logistics system 2 may also be a component of a, or the, systems 22, 22', 22" mentioned above.

Furthermore, the logistics data are also usable for controlling transport vehicles 24, in particular driverless transport vehicles 26. The logistics data may be used, among other things, for stocking or loading transport vehicles 24, in particular driverless transport vehicles 26, with production material 4 or for controlling containers 16. In addition, transport vehicles 24, in particular driverless transport vehicles 26, may be routed, based on the logistics data, in order to supply the production stations 6, 6' with production material 4 as needed.

For this purpose, according to the invention the logistics data are made available to a navigation unit 28 which carries out route planning of the driverless transport vehicles 26 based on the logistics data, to allow path- or time-optimized routing of the driverless transport vehicles for supplying the production stations 6, 6' with production material 4.

To this end, the navigation unit 28 is in signal transmission connection 20 with the driverless transport vehicles 26 in question in order to provide path data for the determined route of the individual driverless transport vehicles 26 as path point coordinates or destination coordinates to the driverless transport vehicles for routing of same.

In addition, the navigation unit 28 likewise allows monitoring of the driverless transport vehicles 26 with regard to their position and movement along a predetermined route for the particular driverless transport vehicle 26.

The central unit 18 of the material logistics system 2 is therefore used for controlling, by means of the logistics data, at least one driverless transport vehicle 26 having a transport rack 32 that includes at least one transport level 30, 30', 30", 30''', for the transport of production material, accommodated in containers, for an automatic container transfer between the transport rack 32 and the storage rack 14 of a production station 6, 6'.

Furthermore, a driverless transport vehicle 26 that is designed and configured according to the invention has a raising/lowering apparatus 36 for at least partially adjusting the height of the at least one transport level in order to compensate for a height difference between the transport level 30, 30', 30", 30''' and a storage level 38, 38', 38", 38''' of the storage rack 14, associated with the transport level, for the container transfer.

FIG. 1 shows a representative example of a plurality of possible signal transmission connections 20 to further data processing units, and a storage facility 39 for containers 16 which may be filled or partially filled with production material 4, or also stored empty.

The aforementioned components of a material logistics system 2 are illustrated and explained in greater detail with respect to the further figures.

Figure 2:
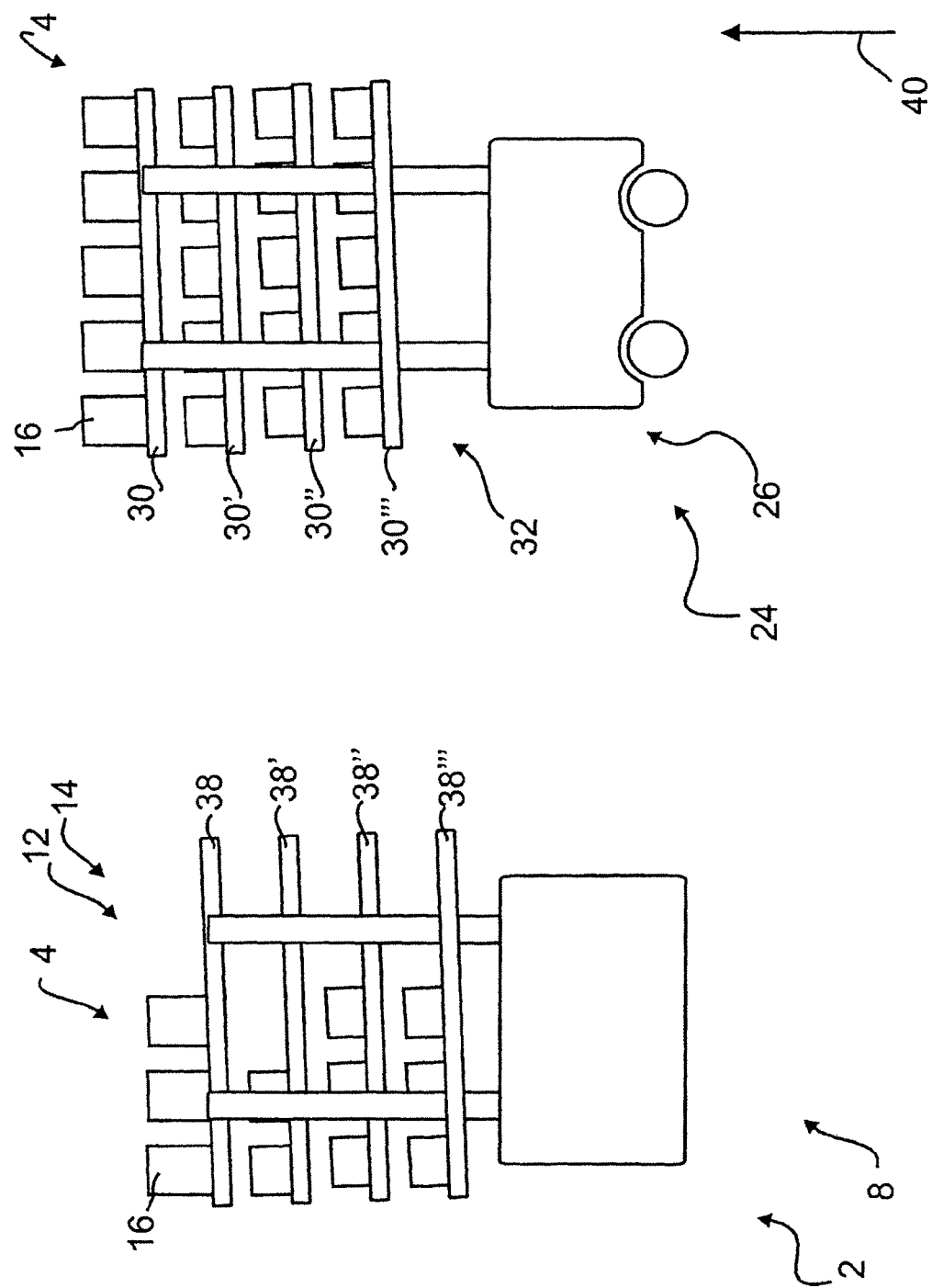
FIG. 2 shows a first driverless transport vehicle of the first embodiment from FIG. 1 in a schematic representation in a side view, the driverless transport vehicle being in a state of movement for approaching a storage rack of a production station.

FIG. 2 shows a first driverless transport vehicle 26' in the embodiment of a material logistics system 2 from FIG. 1, in a schematic representation in a side view, the driverless transport vehicle 26' being in a state of movement for approaching a storage rack 14 of a production station 6.

The transport rack 32 of the first driverless transport vehicle 6 has four transport levels spaced apart from one another in the vertical direction 40, the number and arrangement of which correspond to the storage levels 38, 38', 38", 38'" of a storage rack 14 of a production station 6. This results in a fixed assignment of the transport levels 30, 30', 30", 30'" of the transport rack 32 to the storage levels 38, 38', 38", 38'" of the storage rack 14.

In this regard, by use of a driverless transport vehicle 26 it is possible to fill all storage levels 38, 38', 38", 38'" of the storage rack 14 in one operation via container transfer.

In FIG. 2 it is apparent that there is a height difference between a particular transport level 30, 30', 30", 30'" and the storage level 38, 38', 38", 38'" associated with it for the container transfer, which prevents a problem-free container transfer.

Therefore, the height difference must be compensated for by adjusting the height of the transport levels 30, 30', 30", 30'" of the transport rack 32.

This may take place in a transfer position of the driverless transport vehicle 26 in which the driverless transport vehicle is positioned at the production station 6, 6' in question for the container transfer.

In addition, if the height difference in question is already known, a height adjustment of the transport levels 30, 30', 30", 30'" of the transport rack 32 may take place during the approach of the driverless transport vehicle 26 to the production station 6, 6' in question.

Figure 3:
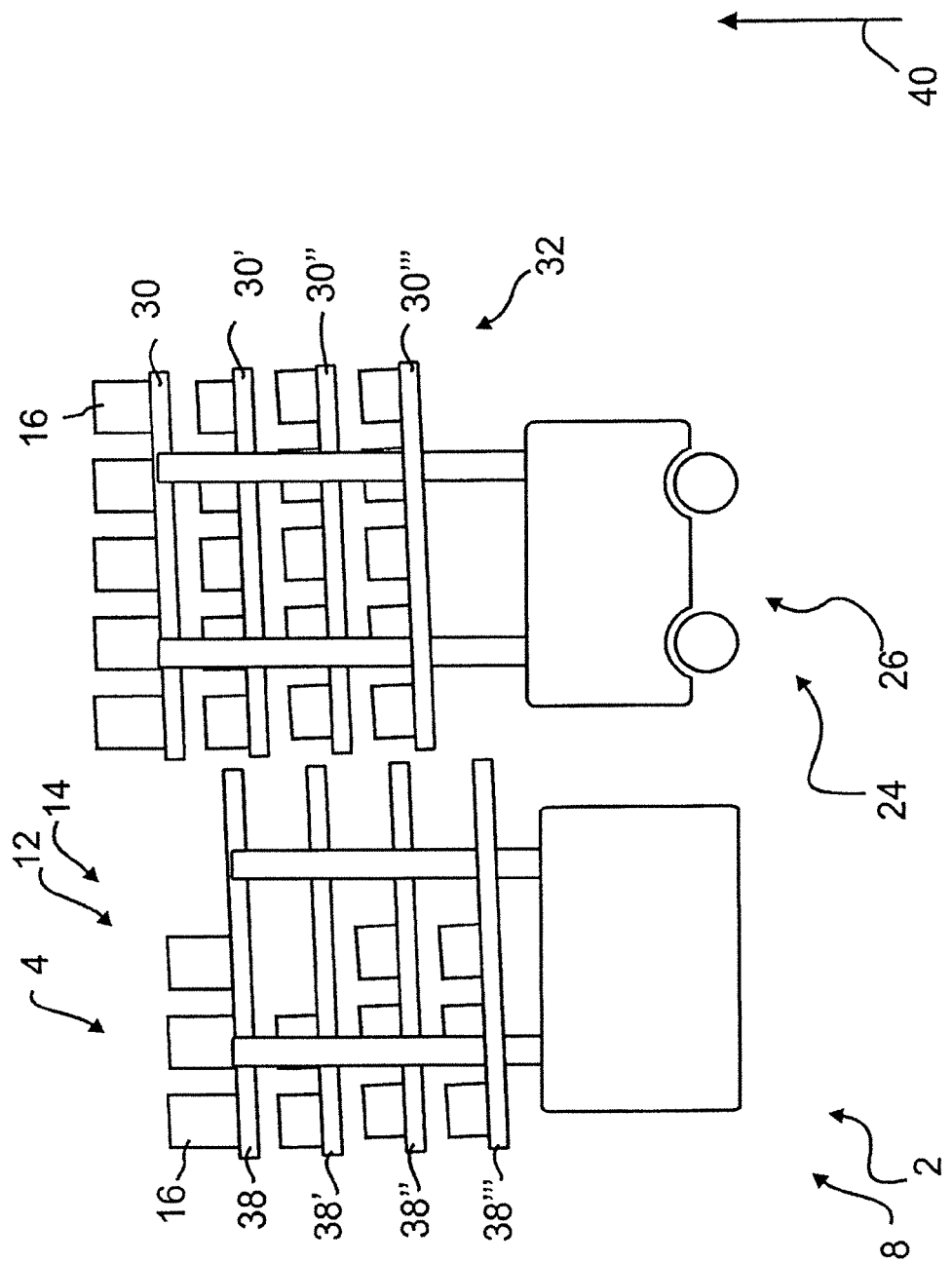
FIG. 3 shows the first driverless transport vehicle from FIG. 1 in a transfer position, in the same representation and view as in FIG. 2.

To this end, FIG. 3 shows the first driverless transport vehicle 26 from FIG. 1 in a transfer position, in the same representation and view as in FIG. 1.

Figure 4:
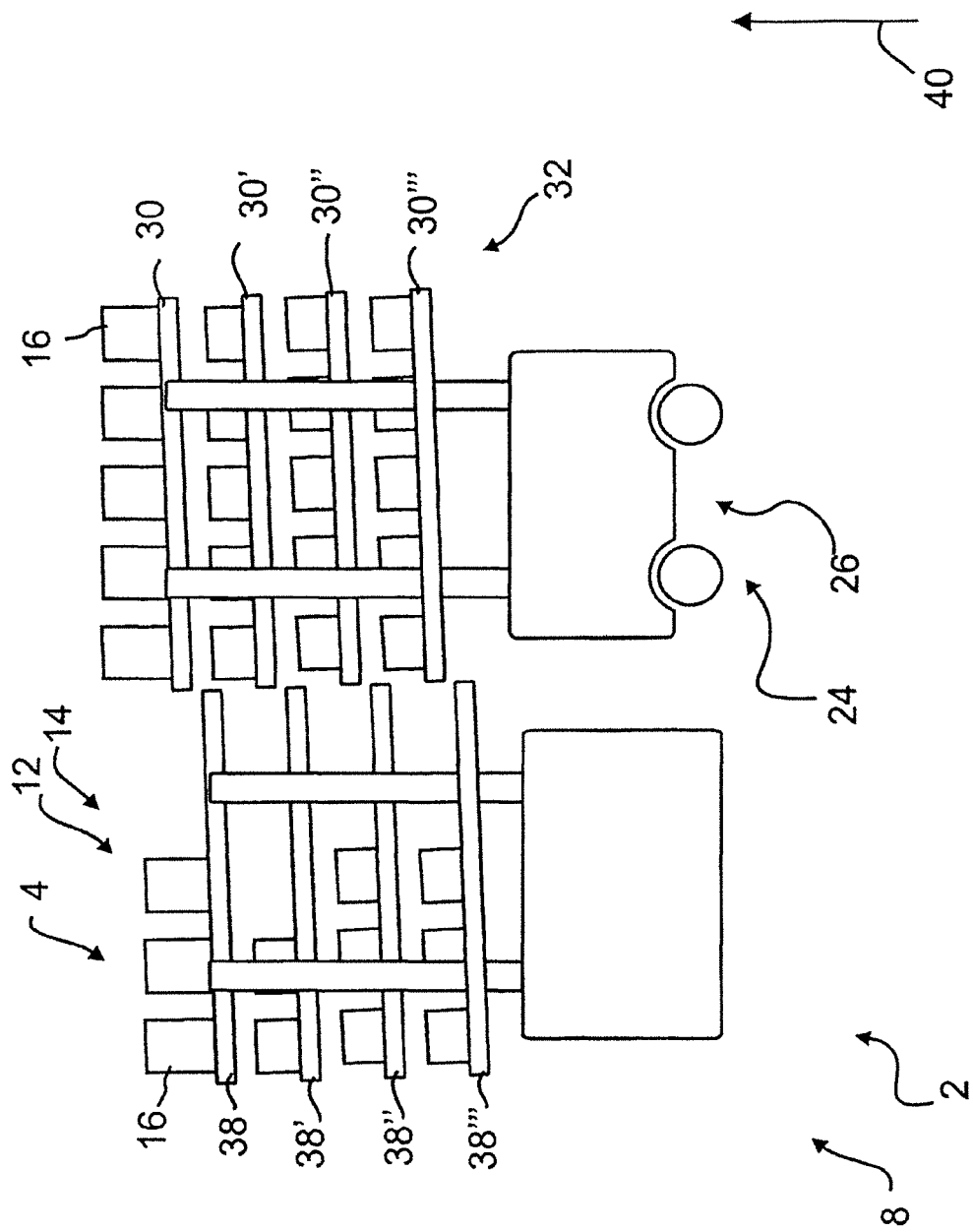
FIG. 4 shows the first driverless transport vehicle from FIG. 1 in a transfer position in which a height adjustment of the transport levels of the transport rack takes place, in the same representation and view as in FIG. 2.

FIG. 4 shows the first driverless transport vehicle 26 from FIG. 1 in a transfer position, in which a height adjustment of the transport levels 30, 30', 30", 30'" of the transport rack 32 takes place by means of a raising/lowering apparatus 36 (not illustrated in FIG. 4).

Figure 5:
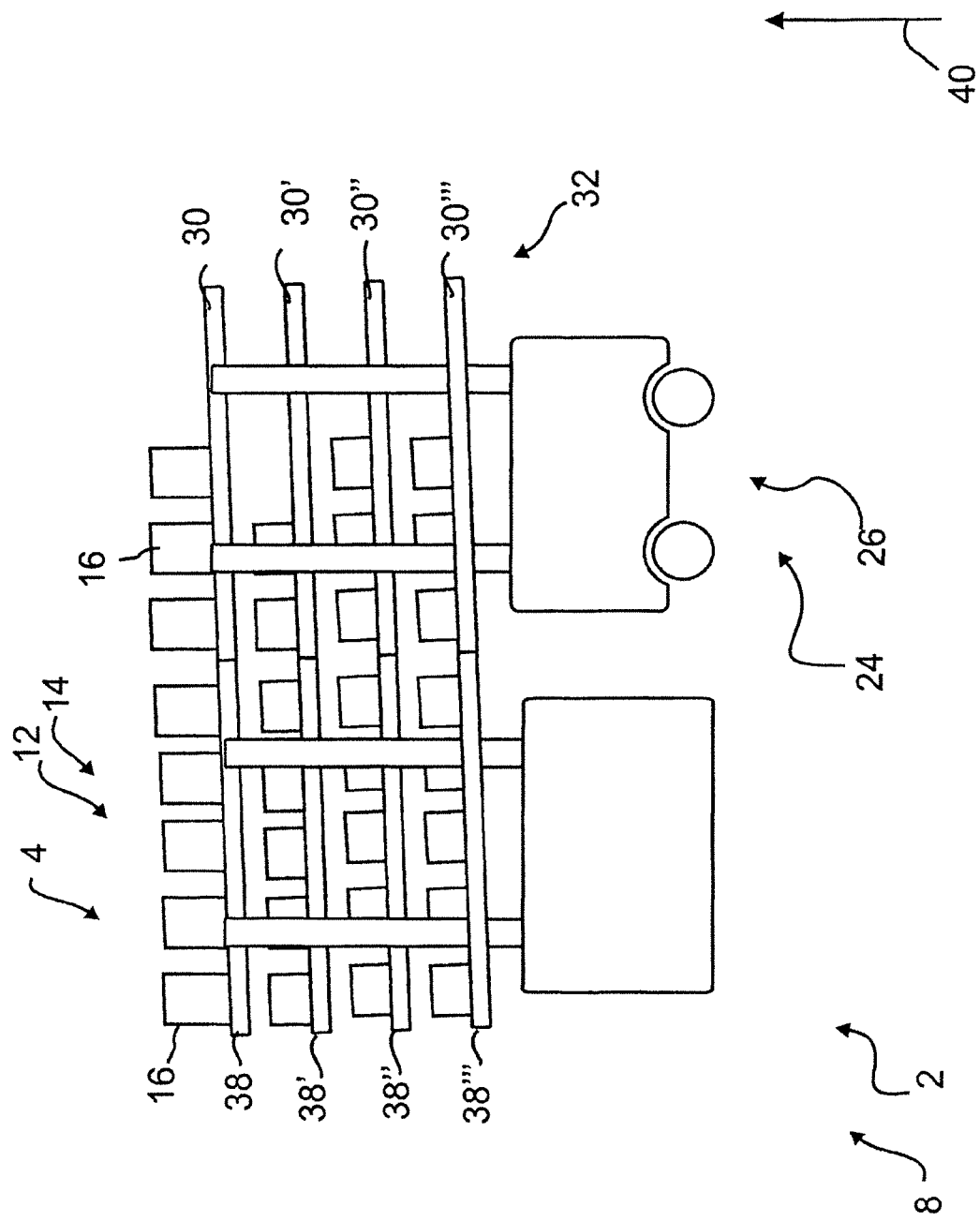
FIG. 5 shows the first driverless transport vehicle from FIG. 1 in a transfer position in which the operation for the height adjustment of the transport levels of the transport rack is completed, in the same representation and view as in FIG. 2.

FIG. 5 shows the first driverless transport vehicle 26 from FIG. 1 in a transfer position, in which the operation for the height adjustment of the transport levels 30, 30', 30", 30'" of the transport rack 32 is completed, and the height difference with respect to the storage level 38, 38', 38", 38'" of the storage rack 14 has been compensated for a problem-free container transfer.

Figure 6:
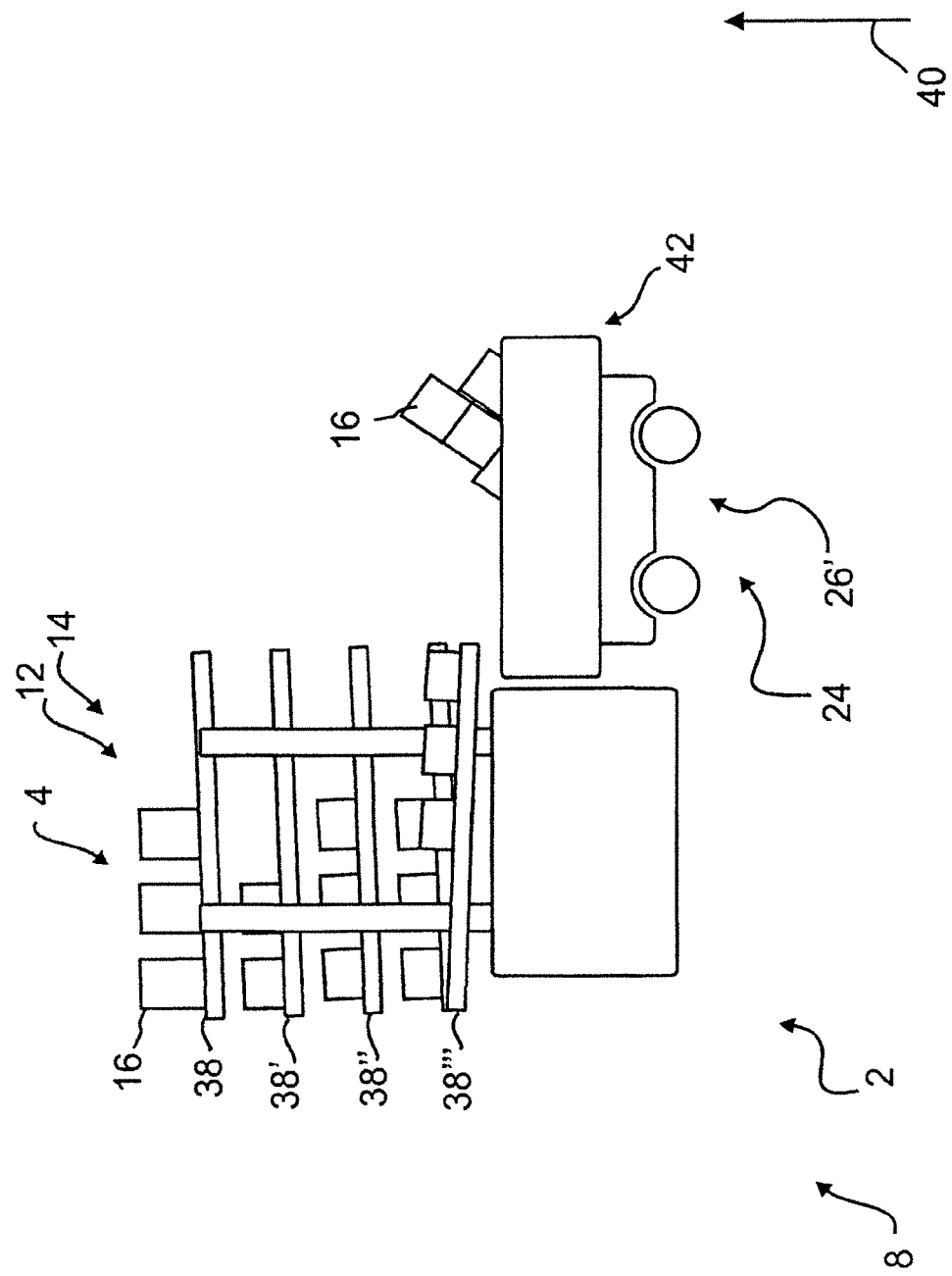
FIG. 6 shows a second driverless transport vehicle of the first embodiment of a material logistics system according to the invention, shown in the preceding figures, in a transfer position, in the same representation and view as the first driverless transport vehicle in FIG. 2.

FIG. 6 shows a second driverless transport vehicle 26' of the material logistics system 2 in a transfer position, in which the second driverless transport vehicle 26' is positioned at a production station 6 for a container transfer. The second driverless transport vehicle 26', illustrated in the transfer position, is used in particular for transporting empty containers away from a production station 6.

The container transfer from the storage rack 14 in question, which has a storage level 38 for empty containers 16, to the driverless transport vehicle takes place with virtually the same process steps as for a container transfer from the transport rack to the storage rack. However, for the container transfer, no height adjustment on the second driverless transport vehicle 26' is necessary; the transport levels 30, 30', 30", 30'" of the transport rack 32 of the first driverless transport vehicle 26 have been replaced by a box-shaped container 42 in which the empty containers 16 from the storage rack 14 are accommodated for being transported away. Against this background, the box-shaped container 42 is likewise height-adjustable by analogy to the transport level(s) 30, 30', 30", 30'".

For this purpose, the containers 16 are supplied to the box-shaped container in a driverless manner, utilizing the weight force of the particular container 16.

Figure 7:
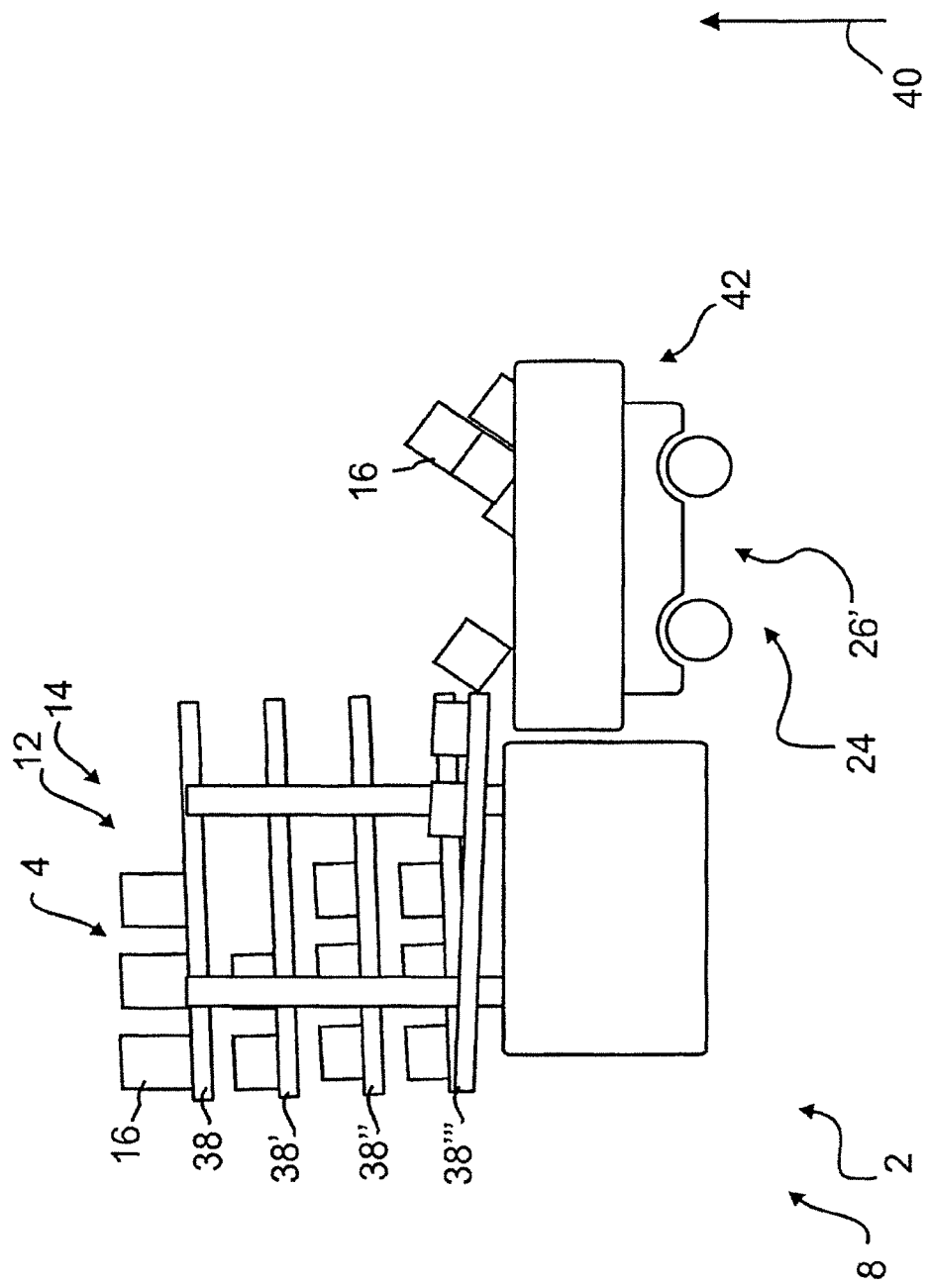
FIG. 7 shows the second driverless transport vehicle in a transfer position in which a transfer of production material from the storage rack to the transport rack takes place, in the same representation and view as in FIG. 6.

FIG. 7 shows the second driverless transport vehicle 26' in a transfer position, in which the containers 16 are supplied from the storage rack 14 to the box-shaped container 42 of the second driverless transport vehicle 26', utilizing the weight force.

Figure 8:
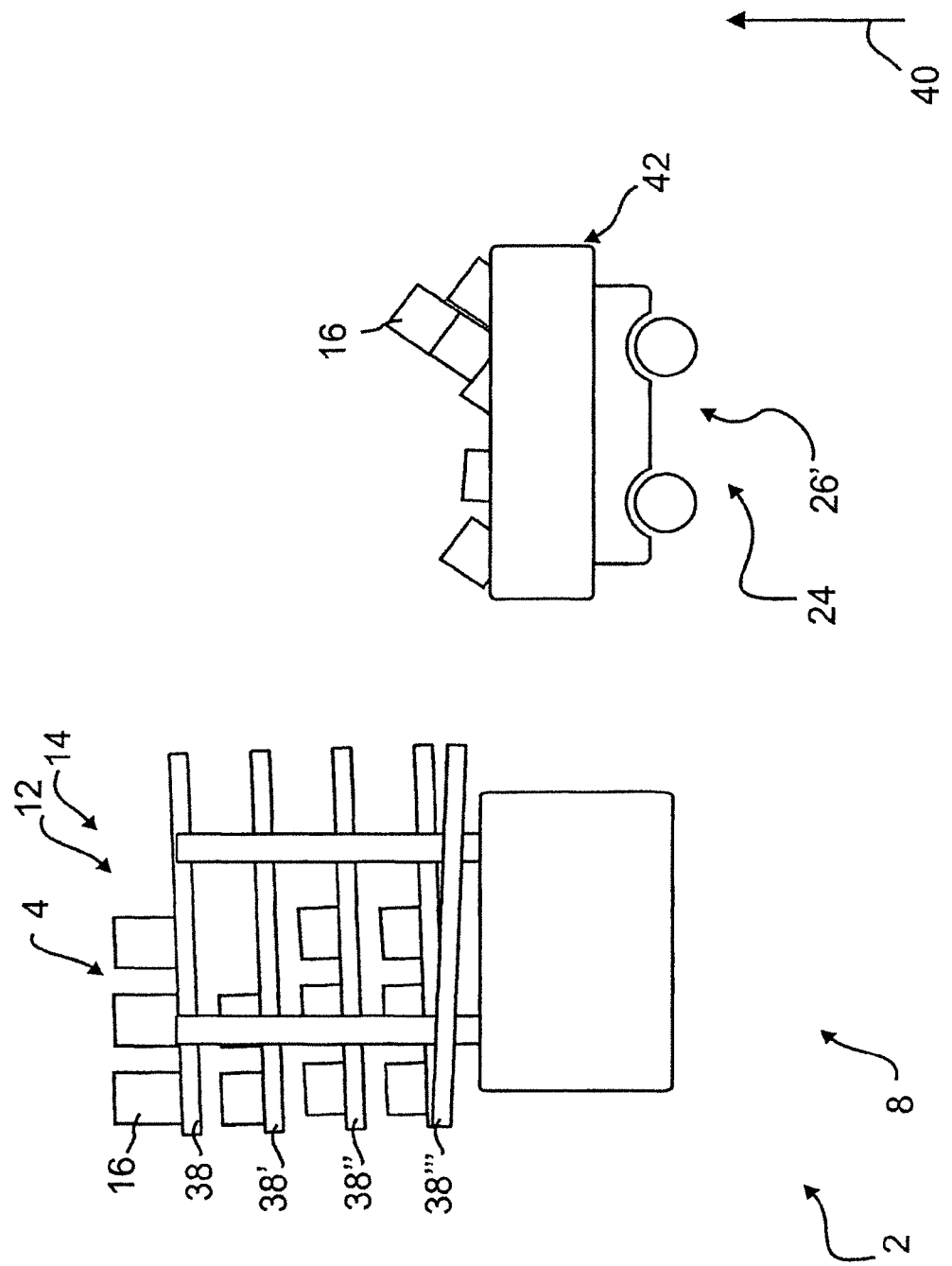
FIG. 8 shows the second driverless transport vehicle in a state of movement in which production material is transported away from the storage rack, in the same representation and view as in FIG. 6.

FIG. 8 shows the second driverless transport vehicle 26' in a state of movement in which empty containers 16 are accommodated in the box-shaped container 42 of the transport rack and transported away from the storage rack. This takes place in the same representation and view as in FIG. 6.

Figure 9:
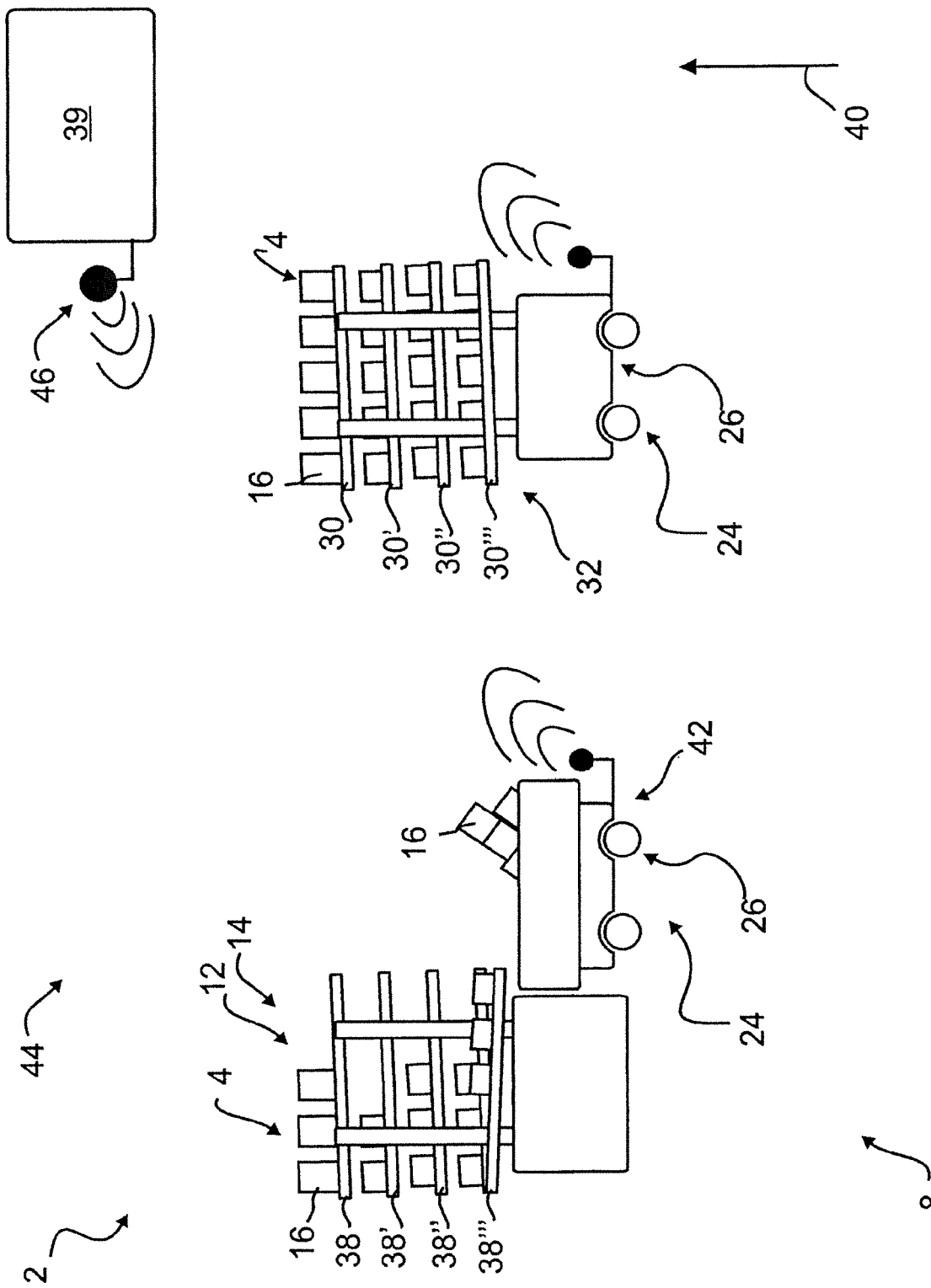
FIG. 9 shows the first and the second driverless transport vehicles, which are routed by means of a GPS-based position finding system, in the same representation and view as in FIGS. 2 and 6.

For illustration of the GPS-based routing control of a driverless transport vehicle 26, 26', FIG. 9 shows the first and second driverless transport vehicles 26, 26', which by means of a GPS-based position finding system 46 are located and guided with regard to their route or movement.

For this purpose, a GPS transmitter 48 wirelessly transmits GPS signals to the driverless transport vehicle 26, 26' to allow position finding and routing. The GPS signals are used in particular for determining the position (position finding) of the particular driverless transport vehicle 26, 26', on the basis of which the routing via the central unit 18 may take place.

To this end, in this embodiment of a material logistics system 2 according to the invention the data exchange between the particular driverless transport vehicle 26, 26' and the central unit 18 takes place bidirectionally, so that the central unit 18 may receive and evaluate the position data of the particular driverless transport vehicle 26, 26' for the further coordination, and in addition the particular driverless transport vehicle 26, 26' receives the destination coordinates necessary for the routing.

To avoid a collision between the driverless transport vehicles 26, 26', the central unit 18 monitors and corrects the routing of driverless transport vehicles 26, 26', in particular driverless transport vehicles at risk of collision.

On this basis, it is likewise possible for the central unit 18 to quickly identify a malfunction of a driverless transport vehicle 26, 26', and to relay or provide appropriate data/ signals for eliminating the malfunction or initiating further associated actions.

Figure 10:
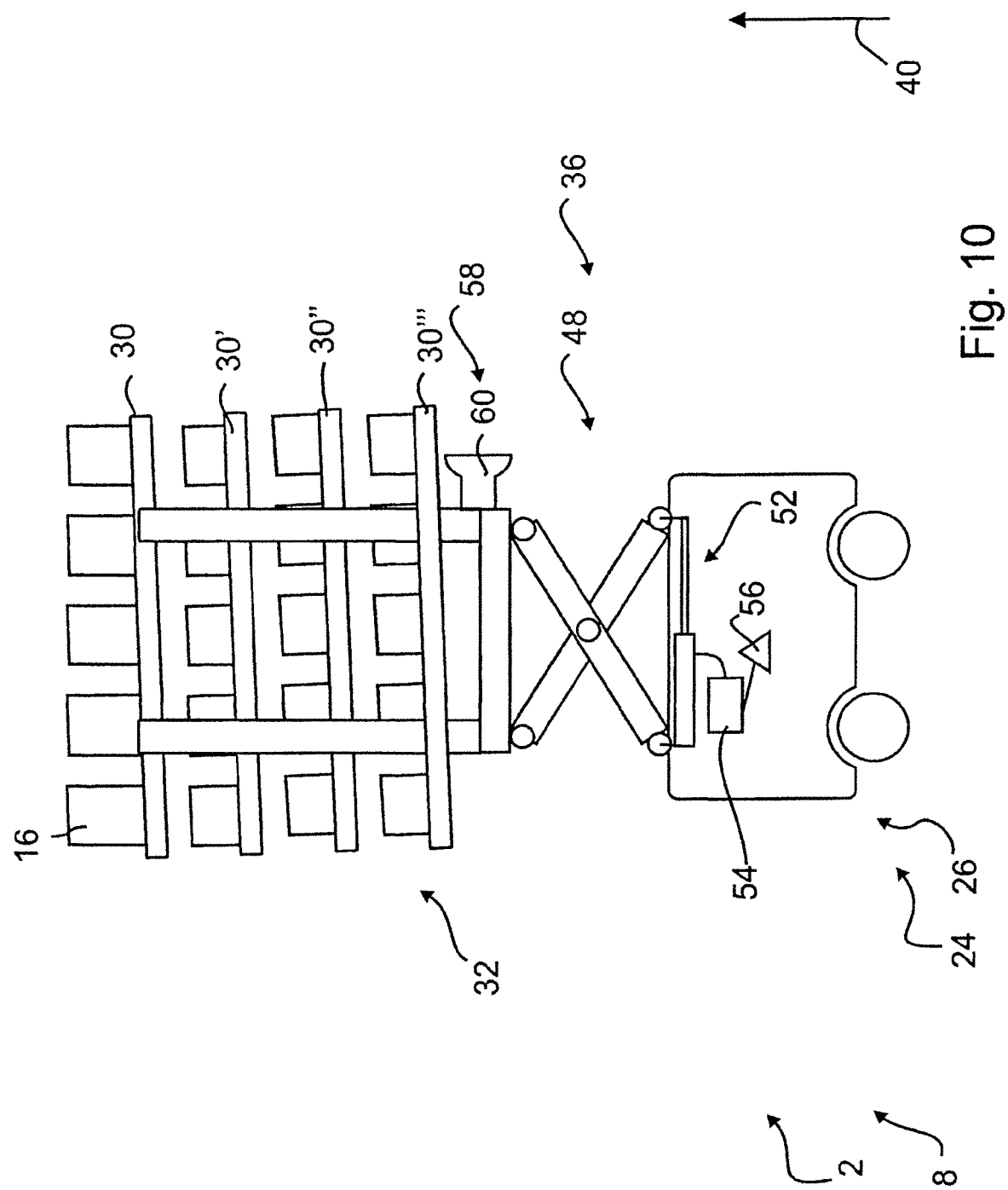
FIG. 10 shows the first driverless transport vehicle from FIG. 1 for illustrating a first option for the height adjustment of a transport level of the transport rack, in the same representation and view as in FIG. 2.

FIG. 10 shows the first driverless transport vehicle 26 from FIG. 1 for illustrating a first option for the height adjustment of at least one of the transport levels 30, 30', 30", 30'" of a transport rack 32.

For achieving a joint height adjustment of transport levels 30, 30', 30", 30'", a scissor lift gear mechanism 48 is used which, by means of a hydraulic unit 50, is adjusted via a hydraulic cylinder 52 between a vertically lower height level and a vertically upper height level, thereby likewise adjusting the height of the transport rack 32 and thus its transport levels 30, 30', 30", 30'" due to the motion coupling with one another.

The raising/lowering apparatus 36 thus provides a hydraulic-mechanical drive 54 for a height adjustment.

For this purpose, a control apparatus 56 allows a fully automatic height adjustment for controlling the raising/ lowering apparatus 36 situated on the driverless transport vehicle 26.

The control apparatus 56 in turn has a sensor or control apparatus sensor 58 for sensing a height difference between a transport level 30, 30', 30", 30'" of the transport rack 32 and the storage level 38, 38', 38", 38'" of the storage rack 14, associated with the transport rack, for a container transfer, the sensor being in signal transmission connection. 20 with the control apparatus.

In this embodiment of a driverless transport vehicle 26' that is part of the material logistics system 2, the sensor 58 has an optically operating sensor 60 that optically detects features for determining a height difference between a transport level 30, 30', 30", 30'" and a storage level 38, 38', 38", 38'" of the storage rack 14, associated with the transport level, for supplying the container.

For this purpose, in this material logistics system 2 an optical character (not illustrated) is situated on the storage signal 14, and is detected by the optically operating sensor 60 when the height difference in question is to be compensated for. To this end, the height of the transport rack 32 is adjusted via the raising/lowering apparatus 36.

If and when two height adjustment operations, in which the height between a vertically lower and a vertically upper height level is adjusted, are completed, a data or signal transmission from the control apparatus 56 of the driverless transport vehicle 26 to the central unit 18 takes place in order to report an error due to a height difference that is outside the possible compensation, whereupon further steps for eliminating the problem may be initiated.

In addition, the differences in the implementation options for a height adjustment are illustrated; essentially, the differences in the particular selected functional principles or modes of action compared to the embodiment of a driverless transport vehicle 26 shown in FIG. 10 are explained.

Figure 11:
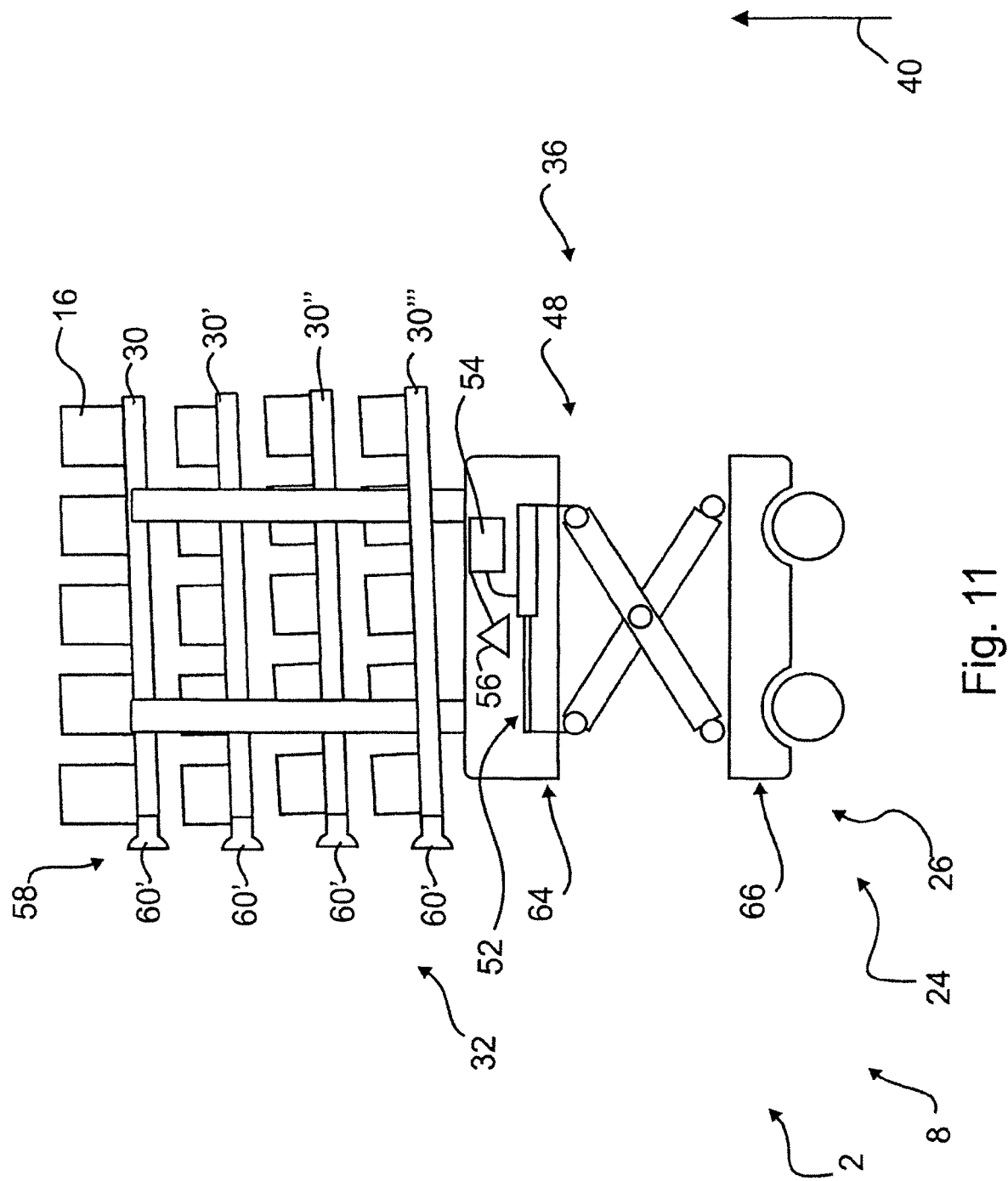
FIG. 11 shows the first driverless transport vehicle from FIG. 1 for illustrating a second option for the height adjustment of a transport level of the transport rack, in the same representation and view as in FIG. 2.

FIG. 11 illustrates a second option for the height adjustment of a transport level 30, 30', 30", 30'" of a transport rack 32, with reference to the first driverless transport vehicle 26 from FIG. 1, in which the raising/lowering apparatus 36 for the container transfer between the transport rack 32 and the storage rack 14 adjusts the height of a body 62 of the driverless transport vehicle 26 in order to compensate for a height difference, in that in a transfer position of the driverless transport vehicle 26, a body part 64 remote from the floor is vertically moved relative to a body part 65 near the floor, thus bringing about a height adjustment of the transport rack 32 and thus, its individual transport levels 30, 30', 30", 30'".

The functional principle for the height adjustment corresponds to the embodiment of a driverless transport vehicle 26 shown in FIG. 10. In contrast thereto, the optically operating sensors 60 are situated on each of the transport levels 30, 30', 30", 30'". The optical features corresponding thereto (omitted in FIG. 11) are situated in a corresponding number and a corresponding configuration on the respective storage levels 38, 38', 38", 38'" of the storage rack 14 (omitted in FIG. 11).

Furthermore, for determining the height difference, optically operating sensors 60 (in each case denoted by reference numeral 60 of the sensor 58 are situated on each transport level 30, 30', 30", 30'" of the transport rack 32

Figure 12:
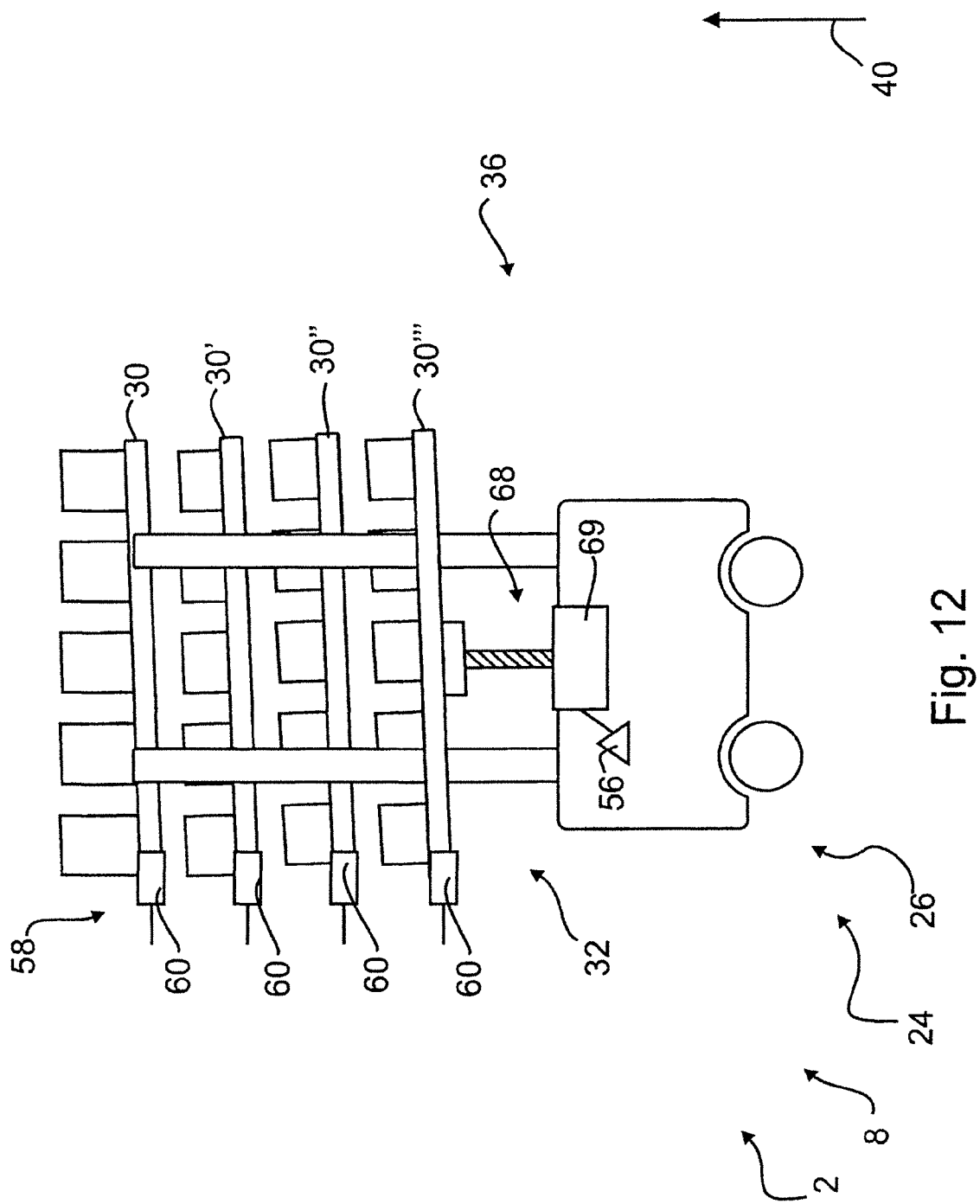
FIG. 12 shows the first driverless transport vehicle from FIG. 1 for illustrating a third option for the height adjustment of a transport level of the transport rack, in the same representation and view as in FIG. 2.

FIG. 12 shows a third option for the height adjustment of at least one transport level 30, 30', 30", 30'" of the transport rack 32, with reference to the first driverless transport vehicle 26 from FIG. 11, in which a height adjustment takes place by means of a spindle drive 68 that is operated via an electric drive motor 69, which in turn is controlled by the control apparatus 56 for the height adjustment. The spindle drive is thus able to appropriately adjust the height of the transport rack 32, thereby jointly adjusting the height of the transport level 30, 30', 30", 30'" of the transport rack 32.

In addition, for determining the height difference, sensors that operate by contact or electromechanically operating sensors 60' (in each case denoted by reference numeral 60 of the sensor 58 are situated on each transport level 30, 30', 30", 30'" of the transport rack 32, by means of which the corresponding storage levels 38, 38', 38", 38'" of the storage rack 14 (omitted in FIG. 12) are contacted as soon as the height difference has reached a setpoint value.

Figure 13:
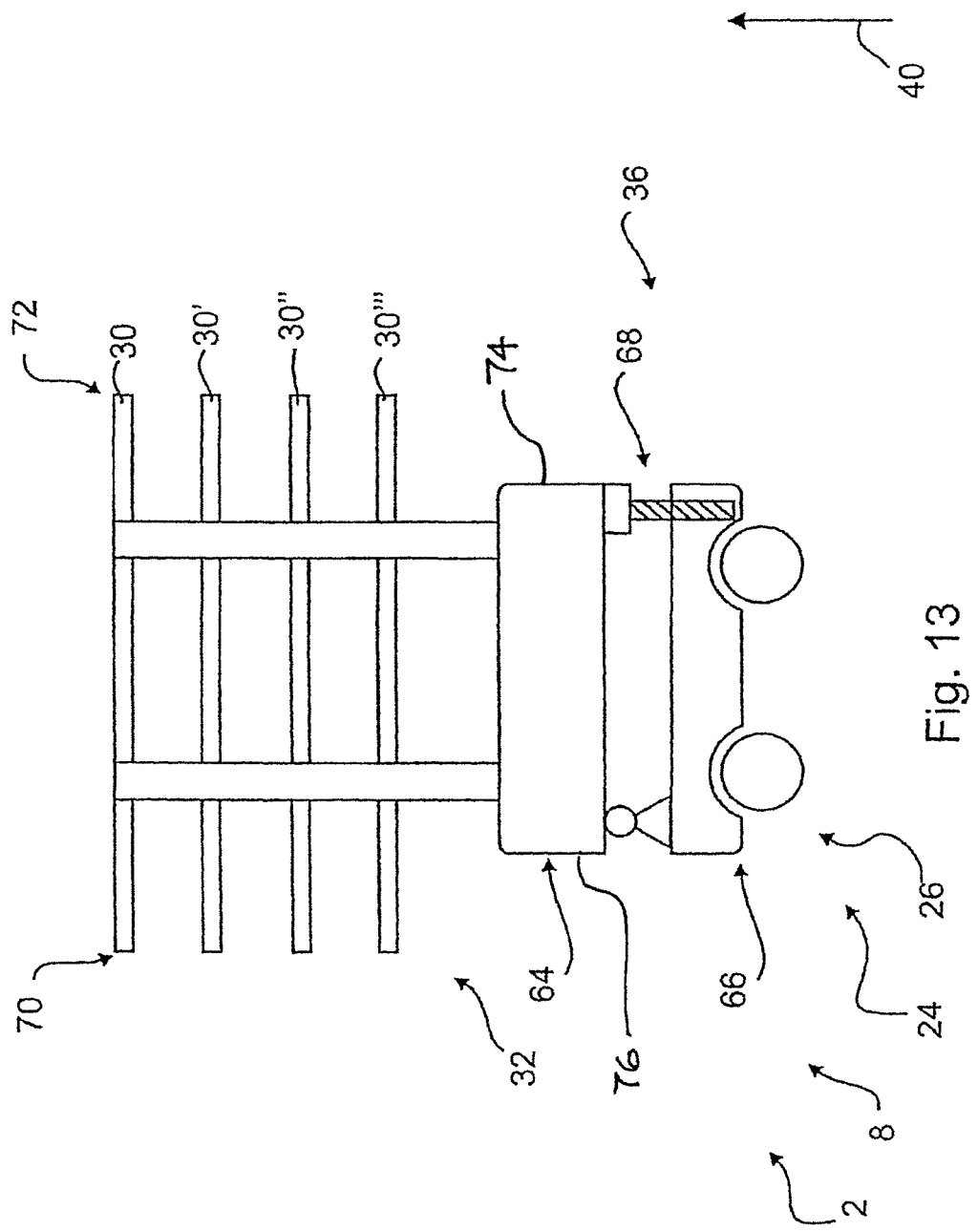
FIG. 13 shows the first driverless transport vehicle from FIG. 1 for illustrating a fourth option for the height adjustment of a transport level of the transport rack, in which the transport rack is in a starting position, in the same representation and view as in FIG. 2, but in less detail.

FIG. 13 shows the first driverless transport vehicle 26 from FIG. 1 for illustrating a fourth option for the height adjustment of at least one transport level 30, 30', 30", 30'" of the transport rack 32.

A height adjustment takes place here in virtually the same manner as illustrated with reference to FIGS. 11 and 12.

In contrast thereto, in order to compensate for the height difference, by means of the raising/lowering apparatus 36 a first side 70 of a transport level 30, 30', 30", 30'", which faces the storage level 38, 38', 38", 38'" of the storage rack 14, associated with the transport level, for supplying the container, is adjusted in height with respect to a second side 72, which faces away from the storage level 38, 38', 38", 38'" of the storage rack 14, associated with the transport level, for supplying the container. The storage rack 14 with the storage levels 38, 38', 38", 38'" is omitted in FIG. 13.

This takes place in that, in the transfer position of the driverless transport vehicle 26, the body part 64 remote from the floor, on a side 74 facing the storage rack 14, is pivotable about a horizontal rotational axis on the body part 66 near the floor, and a height adjustment of the side 76 of the body part 64 remote from the floor, facing away from the storage rack, takes place by means of the spindle drive 68. For clarification, the floor, on which a driverless transport vehicle is situated in a transfer position, is denoted by reference numeral 78 in FIG. 13

Figure 14:
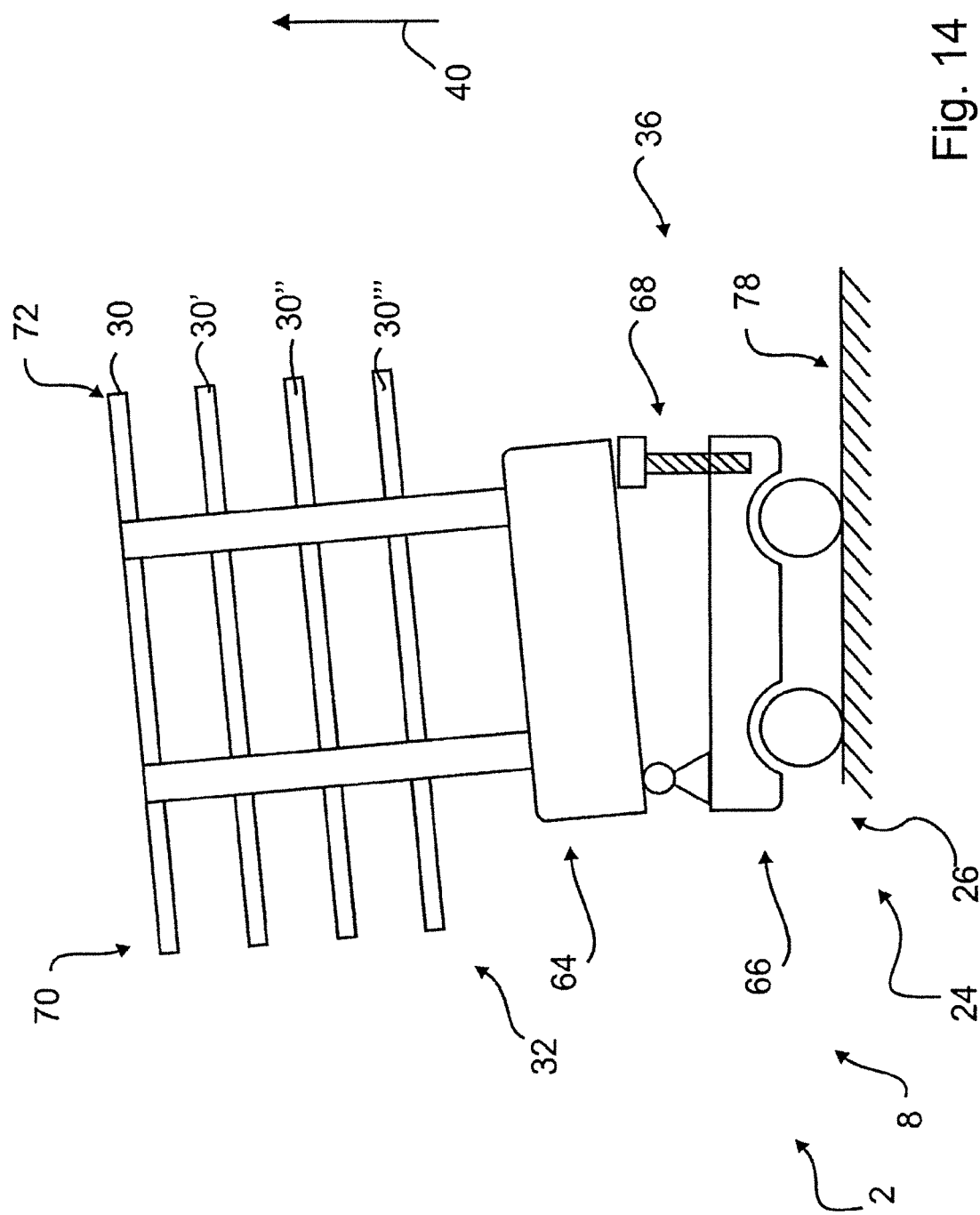
FIG. 14 shows the first driverless transport vehicle from FIG. 13 for illustrating a fourth option for the height adjustment of a transport level of the transport rack, in which the transport rack is in a tilted position, in the same representation and view as in FIG. 2, but in less detail.

FIG. 14 shows the first driverless transport vehicle from FIG. 13, in which a height adjustment has taken place, so that the transport levels 30, 30', 30", 30'" have an inclination with respect to a horizontal plane 80.

Figure 15:
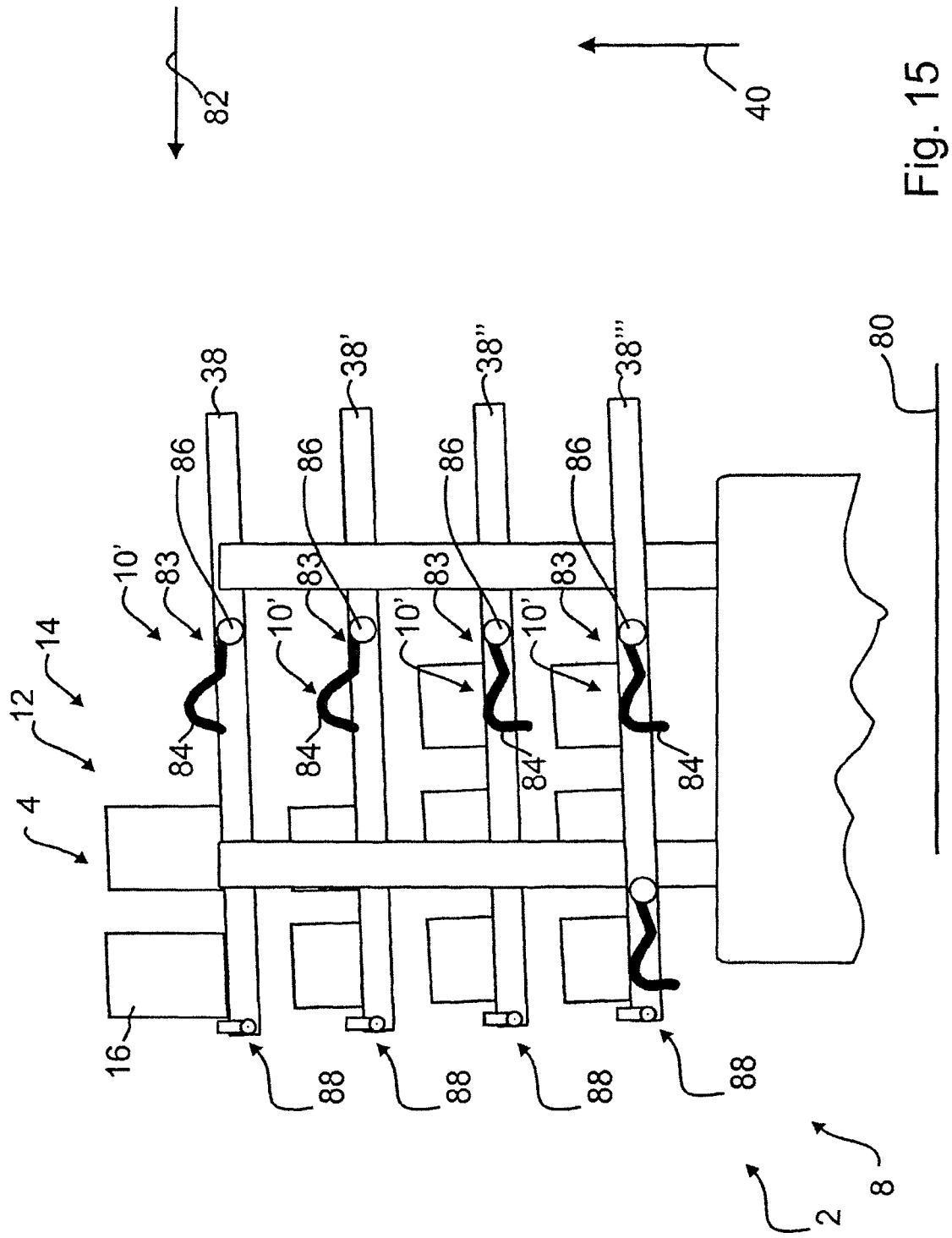
FIG. 15 shows the storage rack with various storage levels 38, 38', 38," 38''' for accommodating containers, in a side view in a schematic representation.

FIG. 15 shows the previously illustrated and described storage rack 14 with storage levels 38, 38', 38", 38'" for accommodating containers 16, in a side view in a schematic representation, the illustration being limited to the upper portion of the storage rack 14. The storage levels 38, 38', 38", 38'" are inclined with respect to the horizontal plane 80, as the result of which the containers are able to slide in the direction of inclination 82 by means of the weight force.

The storage rack 14 has an arrangement of sensor 10 or sensor modules 10', which are uniformly denoted as sensor modules with reference numeral 10' in FIG. 15, and which may be designed as described above. Various parameters for the material logistics may be determined based on the output signals of the respective sensor modules 10'.

The sensor modules 10' shown in FIG. 15 each have an electromechanically operating sensor 83, which is used to draw conclusions as to whether a sufficient number of containers 14 are situated on a particular storage level 38, 38', 38", 38'" of the storage rack 14. For this purpose, a bow-shaped, for example, pivot lever 84 of a particular sensor module 10' is pivoted about a pivot axis 86 as soon as a container 16 comes into contact with the pivot lever 84. In the process, the pivot lever 84 pivots from a neutral position in which it is not under load, into a switching position for generating an appropriate output signal as soon as a container 16 comes into contact with the pivot lever 84 in question. It is thus possible to draw conclusions not only concerning the presence or absence of a container 14 at the location in question, but, due to the degree of pivoting of the pivot lever 84 in question, also concerning the weight of the container 16. For this purpose, the respective sensor of the sensor module 10' generates an appropriate output signal, which is transmitted via a wired connection or wirelessly to the central unit 18 for further processing.

Figure 16:
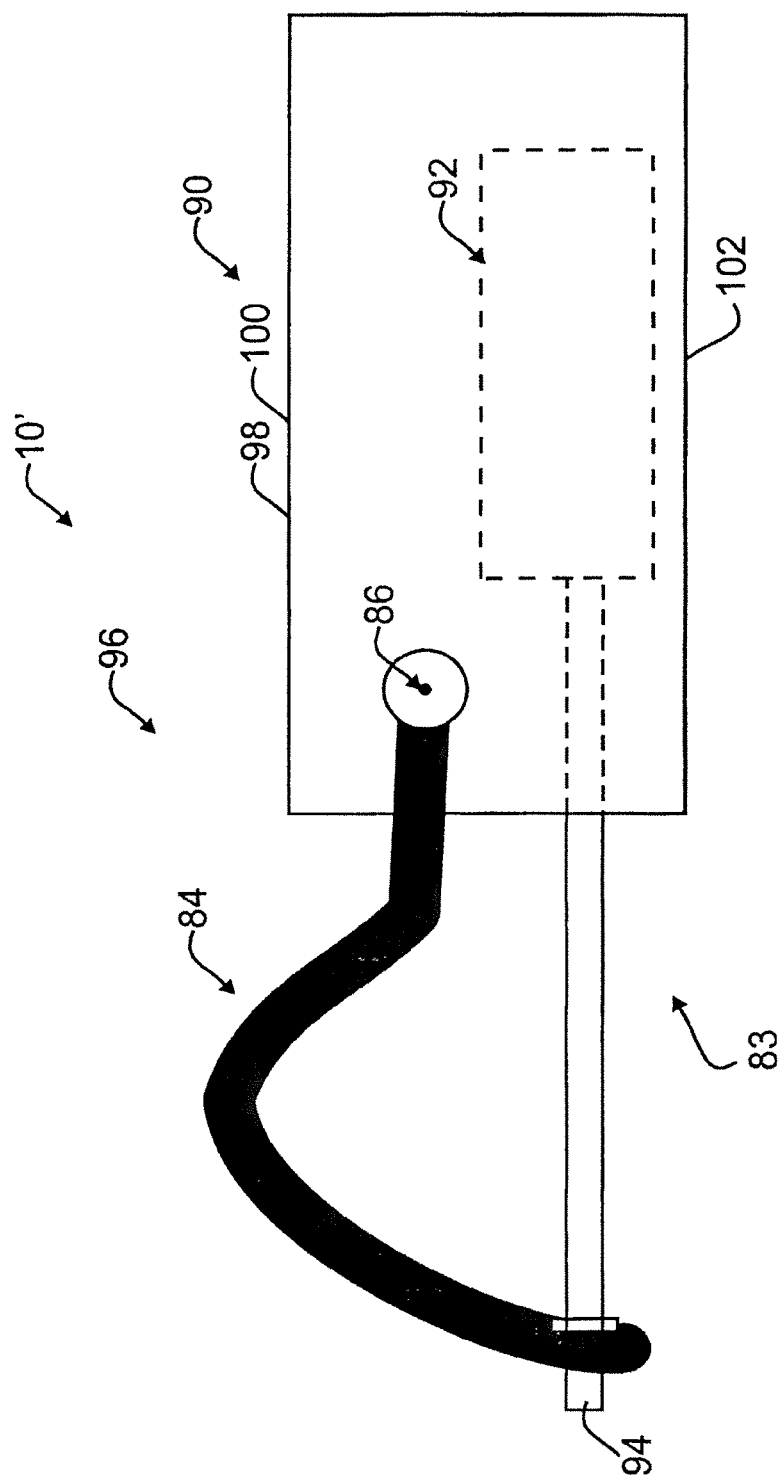
FIG. 16 shows, as a representative example of the fastening of a sensor or sensor module to a support, a sensor module in a side view in a schematic representation.

In addition, blocking elements 88, denoted in each case by reference numeral 88 in FIG. 16, are situated on the storage rack 14. The particular blocking element 88 is movable from a blocking position, in which the storage level 38, 38', 38", 38''' of the storage rack 14 is blocked from delivery of containers 16, to a delivery position, in which containers 16 are able to slide along the storage level 38, 38', 38", 38''' in question in the direction of inclination 82 under the effect of their weight force.

FIG. 16 shows a representative example of the fastening of a sensor or sensor module 10' to a support for a sensor module 10', in a side view in a schematic representation, as already shown in FIG. 2. The sensor module 10' has a base body 90 on which a switch 92 is situated, which in this embodiment is designed as an electrical switch in the manner of a limit switch. The switch 92 has a mechanical probe 94 that is pretensioned in the neutral position by a spring means, such as a spring. The sensor module 10' also has a mechanical switching element 96, which is in operative connection with the switch 92 via the probe of the probe 94 of the mechanical switching element, and which in the illustrated embodiment is designed as a bow-shaped pivot lever 84 that is supported on the base body 90 so as to be pivotable about a pivot axis 86. The switching element 96 is illustrated in a neutral position in FIG. 16. In this position, an appropriate signal ("no container in the supply channel; material requisition necessary") may be transmitted to the central unit 18 via a wired connection or a radio module.

In the illustrated embodiment, the base body 90 is made of a plastic injection-molded part, and has two legs 98, 100 that are spaced apart from one another in the axial direction of the pivot axis 86 and joined together by a central web, so that the base body 90 has the shape of a hollow profile that is open on one side. However, due to the representation selected in FIG. 16, the leg 100 is concealed by the leg 98.

This type of sensor module 10' may likewise be used for determining the weight of a container 16, on the basis of which conclusions concerning the filling level of the container may be drawn.

Furthermore, it is possible to meaningfully transfer the defining features of a storage rack 14 to a transport rack 32. Therefore, the descriptions of the components of a storage rack 14, when suitably adapted, also apply to a transport rack 32.

In sum, numerous embodiment options result within the scope of the invention, of which the embodiments described above represent only an exemplary selection from the variety of implementation options.

While this invention has been described as having a preferred design, it is understood that it is capable of further modifications, and uses and/or adaptations of the invention and following in general the principle of the invention and including such departures from the present disclosure as come within the known or customary practice in the art to which the invention pertains, and as may be applied to the central features hereinbefore set forth, and fall within the scope of the invention.

What is claimed is:

1. A material logistics system for coordinating transfer of production material so that the production material is available as needed at production stations and storage racks of a manufacturing facility, comprising:

a) at least one driverless transport vehicle that is not restricted to one of the production stations and storage racks;

b) a plurality of sensors for sensing a production material supply at the production stations, and the plurality of sensors transmitting output signals based on the sensed production material supply;

c) at least one central unit which is in signal-transmitting connection with the plurality of sensors and which, on the basis of the output signals transmitted from the plurality of sensors, determines logistics data relating to the production material for a particular one of the production materials and, by using the logistics data, generates control signals for the transfer of the production material and also provides the generated control signals for further data processing units;

d) the at least one central unit uses the logistics data to control the at least one driverless transport vehicle, having a transport rack including at least one transport level, for transporting the production material accommodated in containers, for an at least partially automatic container transfer between the transport rack and a storage rack of one of the production stations;

e) the at least one driverless transport vehicle has a raising/lowering apparatus for adjusting a height of the at least one transport level in order to compensate for a height difference between the at least one transport level and a storage level of the storage rack associated with the at least one transport level, for the container transfer;

f) the raising/lowering apparatus for compensating for the height difference adjusts the height of a first side of the transport level of the transport rack, which faces the storage level of the storage rack, associated with the transport level, for supplying the container, with respect to a second side of the transport rack, which faces away from the storage level of the storage rack, associated with the transport level, for supplying the container; the raising/lowering apparatus adjusts the height of the transport level, so that the transport level has an inclination with respect to a horizontal plane, so that the container transfer from the transport level to the storage level takes place under a force of gravity;

g) the storage level of the storage rack is inclined, so that when a frontmost container in the direction of inclination is removed from the storage level, a container behind the frontmost container in the direction of inclination slides down due to the force of gravity;

h) a control apparatus is provided for controlling the raising/lowering apparatus for a fully automatic or semiautomatic height adjustment, and the control apparatus has a control apparatus sensor;

i) the control apparatus sensor senses the height difference between the transport level of the transport rack and the storage level of the storage rack, associated with the transport rack for the control apparatus, and the control apparatus controls the raising/lowering apparatus for a fully automatic or semiautomatic height adjustment for the container transfer; and j) for its position finding and routing, the at least one driverless transport vehicle has at least one receiver for receiving data of at least one position finding system.

2. The material logistics system according to claim 1, wherein:

a) for compensating for the height difference, the raising/lowering apparatus for the container transfer between the transport rack and the storage rack adjusts, at least partially, the height of a body of the at least one driverless transport vehicle.

3. The material logistics system according to claim 1, wherein:
   a) for compensating for the height difference, the raising/lowering apparatus for the container transfer between the transport rack and the storage rack adjusts, at least partially, at least one transport level, or the transport rack, of the at least one driverless transport vehicle.

4. The material logistics system according to claim 1, wherein:
   a) the control apparatus is situated on the at least one driverless transport vehicle.

5. The material logistics system according to claim 1, wherein:
   a) the sensor has at least one electromechanically operating sensor with at least one probe that contacts the storage level, of the storage rack, associated with the transport level of the transport rack, for supplying the container, or contacts the storage rack, in order to determine the height difference; or
   b) has least one optically operating sensor that optically detects optically detectable features in order to determine the height difference; or
   c) has at least one capacitively operating sensor that senses a change in capacitance in order to determine a height difference.

6. The material logistics system according to claim 1, wherein:
   a) the raising/lowering apparatus has at least one hydraulic or pneumatic or electrical drive for the height adjustment.

* * * * *